US011215713B2

(12) United States Patent
Naveen et al.

(10) Patent No.: US 11,215,713 B2
(45) Date of Patent: Jan. 4, 2022

(54) TONES PROCESSING SYSTEM IN A GLOBAL NAVIGATION SATELLITE SYSTEM RECEIVER

(71) Applicant: Accord Ideation Private Limited, Bangalore (IN)

(72) Inventors: Gowdayyanadoddi Shivaiah Naveen, Bangalore (IN); Vikram Kudligi Hiramat, Bangalore (IN); Rajashekaran Chinnadurai, Chennai (IN); Manjeeth Thattam Kandiyil, Mahe (IN); Mahesh Kumar, Mangalore (IN)

(73) Assignee: ACCORD IDEATION PRIVATE LIMITED, Bengaluru (IN)

( * ) Notice: Subject to any disclaimer, the term of this patent is extended or adjusted under 35 U.S.C. 154(b) by 267 days.

(21) Appl. No.: 16/352,877

(22) Filed: Mar. 14, 2019

(65) Prior Publication Data
US 2020/0200915 A1 Jun. 25, 2020

(30) Foreign Application Priority Data
Dec. 21, 2018 (IN) .............................. 201841048568

(51) Int. Cl.
*G01S 19/21* (2010.01)
*G01S 19/35* (2010.01)
(Continued)

(52) U.S. Cl.
CPC .............. *G01S 19/21* (2013.01); *G01S 19/35* (2013.01); *G01S 19/36* (2013.01); *G01S 19/37* (2013.01)

(58) Field of Classification Search
CPC .......... G01S 19/21; G01S 19/35; G01S 19/36; G01S 19/03
(Continued)

(56) References Cited

U.S. PATENT DOCUMENTS 5,101,416 A * 3/1992 Fenton .................... G01S 19/21
375/150
5,596,600 A * 1/1997 Dimos .................... G01S 19/21
370/208
(Continued)

OTHER PUBLICATIONS

S. Savasta, L. Lo Presti and M. Rao, "Interference Mitigation in GNSS Receivers by a Time-frequency Approach," in IEEE Transaction on Aerospace and Electronic Systems, vol. 49, No. 1, pp. 415-438, Jan. 8, 2013; p. 10, IV. GNSS Signal and System Model, B. Tracking stage; p. 13, VI. STFT Threshold Definition With a Non-Flat Front-End Filter; Figures 4, 5.
(Continued)

*Primary Examiner* — Chuong P Nguyen
(74) *Attorney, Agent, or Firm* — Rangarajan Sourirajan; Rajan Law Office, LLC

(57) ABSTRACT

A tones processing system including an interference tone determination module (ITDM), an interference tone tracker module (ITTM) and an interference tone removal module (ITRM) is provided. The ITDM sequentially searches for one or more continuous wave interference (CWI) tones in N samples of intermediate frequency (IF) data within a programmable signal frequency band. The ITTM tracks the detected CWI tones. The ITRM removes the tracked CWI tones from the N samples of IF data using one or more interference tone removal units (ITRUs). Each of the ITRUs includes a second signal generator, a second mixer, a tone filter for suppressing the tracked CWI tones, and a quantizer for reducing the number of processing bits in a tone suppressed output signal. The ITRM performs frequency shift compensation and phase rotation compensation with reduced logic area and power consumption in the global navigation satellite system receiver.

25 Claims, 15 Drawing Sheets

(51) Int. Cl.
*G01S 19/36* (2010.01)
*G01S 19/37* (2010.01)

(58) Field of Classification Search
USPC ............ 342/357.59, 357.76, 357.77, 357.78
See application file for complete search history.

(56) References Cited

U.S. PATENT DOCUMENTS

| | | | |
|---|---|---|---|
| 6,512,803 B2 * | 1/2003 | Heinzl | G01S 19/21 |
| | | | 375/350 |
| 6,842,498 B2 | 1/2005 | Heinzl et al. | |
| 7,436,356 B2 * | 10/2008 | Bochkovskiy | G01S 19/21 |
| | | | 342/107 |
| 7,688,262 B2 * | 3/2010 | Bochkovskiy | G01S 19/29 |
| | | | 342/357.57 |
| 7,912,158 B2 * | 3/2011 | Cahn | G01S 19/21 |
| | | | 375/345 |
| 8,023,917 B2 | 9/2011 | Popescu | |
| 8,184,676 B2 * | 5/2012 | Lennen | G01S 19/21 |
| | | | 375/148 |
| 8,345,730 B2 * | 1/2013 | Le Liboux | H04K 3/90 |
| | | | 375/148 |
| 9,291,715 B2 | 3/2016 | Wang et al. | |
| 10,677,930 B2 * | 6/2020 | Parikh | G01S 19/37 |
| 10,830,903 B2 * | 11/2020 | Naveen | G01S 19/33 |
| 2003/0216863 A1 * | 11/2003 | Fielder | G01S 19/37 |
| | | | 701/469 |
| 2005/0201498 A1 | 9/2005 | Nakai | |
| 2008/0240315 A1 | 10/2008 | De Mey et al. | |
| 2018/0323814 A1 | 11/2018 | De Mey et al. | |

OTHER PUBLICATIONS

Ren, H., Wang, Y., Jiang, L. et al. CW interference mitigation in GNSS receiver based on frequency-locked loop. Sci China Inf. Sci. 59, 082201, Jun. 16, 2016 (whole document).

* cited by examiner

TONES PROCESSING SYSTEM IN A GLOBAL NAVIGATION SATELLITE SYSTEM RECEIVER

CROSS-REFERENCE TO RELATED APPLICATIONS

This application claims priority to and the benefit of the non-provisional patent application titled "Tones Processing System In A Global Navigation Satellite System Receiver", application number 201841048568, filed in the Indian Patent Office on Dec. 21, 2018. The specification of the above referenced patent application is incorporated herein by reference in its entirety.

BACKGROUND

Global navigation satellite system (GNSS) constellations include, for example, the global positioning system (GPS) constellation, the Globalnaya Navigatsionnaya Sputnikovaya Sistema (GLONASS) constellation, the Galileo constellation, the BeiDou navigation satellite system constellation, the Indian regional navigation satellite system (IRNSS) constellation, the Quasi-Zenith satellite system (QZSS) constellation, and constellations of satellite based augmentation systems (SBAS) in well-defined geostationary orbits. Each satellite in the GNSS constellations continuously broadcasts GNSS signals that contain accurate system time and an orbital position of the corresponding satellite. With increasing global navigation satellite system (GNSS) constellations in the sky, there is an increased need for GNSS receivers that are capable of receiving and processing signals from all the GNSS constellations. For example, the GNSS receivers should be able to receive signals from the satellites of the GNSS constellations to provide accurate and reliable geographical position, velocity and time. A GNSS receiver, upon receiving a GNSS signal, performs signal acquisition and tracking operations.

The global navigation satellite system (GNSS) signals are weak signals that are relatively vulnerable to interference caused by unwanted signals resulting in reduced accuracy of the GNSS receivers, or the inability of the GNSS receivers to calculate location data. The interference signals, that is, the unwanted signals, may be categorized as being continuous wave type, narrow band or wide band, or pulsed type. The interference signals comprise multiple frequency components or continuous wave interference tones. The GNSS receivers operational in multiple constellations and in multiple frequencies have to process wider bandwidths compared to a GNSS receiver operational in a single constellation and for a single frequency. While processing the wider bandwidths, the probability of the GNSS receiver to be provided with an increased number of continuous wave interference tones is higher.

Detecting the continuous wave interference tones is crucial for performance of a global navigation satellite system (GNSS) receiver in terms of time to first fix. When the GNSS receiver is operating in a pre-interference environment, it is difficult to acquire and track the GNSS signal received from a satellite if power of the continuous wave interference tones is above noise power of the GNSS receiver. Therefore, as soon as a continuous wave interference tone is detected, the continuous wave interference tone has to be removed by a tone removal module of the GNSS receiver and a tone suppressed digital signal with intermediate frequency (IF) samples has to be provided to the GNSS baseband processor for satellite signal acquisition and tracking unit.

A method for mitigating continuous wave interference tones is by cancellation of the continuous wave interference tones using a replica of the continuous wave interference tones rather than removal of the continuous wave interference tones from the global navigation satellite system (GNSS) signals by filtering. The GNSS receivers generate replicas of the continuous wave interference tones and subtract the continuous wave interference tones from the GNSS signals. However, if the replicas of the continuous wave interference tones are not identical and 180 degrees out of phase from the continuous wave interference tones, more continuous wave interference tones will be added in the frequency band of the GNSS signals.

Notch filter based approaches to detect and mitigate the continuous wave interference tones in the global navigation satellite system (GNSS) signals by the GNSS receivers are employed. The notch filters mitigate the continuous wave interference tones and extend the ability of the GNSS receivers to operate in the presence of continuous wave interference tones. Frequency of a filter notch of the notch filter is an estimate of instantaneous tone frequency of one of the continuous wave interference tones. The notch filters eliminate the continuous wave interference tones that are within a narrow frequency band. For wider band widths or multiple frequency bands of the GNSS signals of the multiple GNSS constellations, the GNSS receivers must possess numerous processing modules, including the notch filters to remove the continuous wave interference tones in different frequency bands and restore the GNSS signals from which the continuous wave interference tones are removed to original frequency bands. Therefore, any extra hardware logic required for removing a single continuous wave interference tone gets multiplied by the number of the continuous wave interference tones in the GNSS signals, which in turn significantly increases number of hardware components, and the total hardware logic area of the GNSS receivers.

Moreover, a sampling frequency requirement of the global navigation satellite system (GNSS) receivers will be higher due to wider bandwidth requirements attributed to the GNSS signals of the multiple constellations. Furthermore, any additional hardware component in the GNSS receivers for detection and mitigation of the continuous wave interference tones consumes more power. Therefore, there is a need for reducing the number of hardware components or the hardware logic area and also the number of processing operations within tone processing systems of the GNSS receivers.

Consider an example of a global navigation satellite system (GNSS) receiver with a tone processing system for detecting and mitigating up to four continuous wave interference tones with frequencies $f_1$, $f_2$, $f_3$, and $f_4$ using mixers, digital band stop filters, and oscillators. One of the mixers followed by one of the digital band stop filters and an oscillator suppress a single continuous wave interference tone. The mixers are controlled by the oscillator in such a way that each of the mixers provides a shifted digital signal to the following digital band stop filter. Also, each of the oscillators receives a phase signal from a preceding oscillator. The output of a first oscillator is a phase signal $-f_1 t$ corresponding to a tone frequency $f_1$ of a continuous wave interference tone. A complex exponential $e^{2\pi j f_1 t}$ is derived and input to a first mixer which shifts the received down converted GNSS signal in the frequency domain by $-f_1$ to generate a shifted digital signal. The following first digital band stop filter suppresses a fixed frequency component of the shifted digital signal with a suppression band centered at a suppression frequency equal to zero at the frequency $f_1$ in the received down converted GNSS signal.

Similarly, a second oscillator of the tone processing system outputs a phase signal $-f_2 t$ from which the phase signal $f_1 t$ output by the first oscillator is subtracted. A complex exponential $e^{2\pi j(f_2 - f_1)t}$ using a phase difference signal $(f_1 - f_2)t$ is derived and fed to a second mixer which shifts the shifted digital signal output from the first band stop filter in the frequency domain by $f_1 - f_2$. That is, the received down converted global navigation satellite system (GNSS) signal is shifted in the frequency domain by $-f_2$ to generate a shifted digital signal. The following second digital band stop filter suppresses a fixed frequency component of the shifted digital signal with a suppression band centered at a suppression frequency equal to zero at the frequency $f_2$ in the received down converted GNSS signal.

The tone frequency of a second continuous wave interference tone $f_2$ is derived by subtracting the phase signal generated by the first oscillator and the phase signal generated by the second generator. Similarly, subtraction operations are required to derive the other tone frequencies in the received down converted global navigation satellite system (GNSS) signal. One subtraction operation with one subtraction component per each continuous wave interference tone in the received down converted GNSS signal is performed in the GNSS receiver. These subtraction operations increase processing requirement, hardware logic area, and power consumption of the GNSS receivers as the number of the continuous wave interference tones that are to be mitigated, increase. However, the oscillators in the GNSS receiver can be programmed to generate carrier signals at required frequencies thereby avoiding extraneous processing operations. Furthermore, the carrier signals directly generated at required frequencies will result in a phase rotation in the received down converted GNSS signal. The amount of the phase rotation in the received down converted GNSS signal contributed by each of the continuous wave interference tones has to be estimated and compensated in the GNSS receiver.

On removal of the tour continuous wave interference tones, a frequency-shift is introduced in the received down converted global navigation satellite system (GNSS) signal. This frequency shift in the received down converted GNSS signal is compensated by an oscillator and a mixer at the end of the tone processing system. The oscillator at the end of the tone processing system generates a required compensation frequency and mixes with a tone free digital signal from a preceding band stop filter in the mixer. The mixer generates a shifted digital signal that is shifted to an original position in the frequency domain. However, the mixer increases bit-width of the shifted digital signal at the output of the mixer relative to the input of the mixer, and therefore increases processing load on the subsequent stages of the GNSS receiver or demands a quantizer to reduce the number of bits in the shifted digital signal. Hence, compensating for frequency-shift using the frequency shift compensation circuit comprising the mixer and the oscillator at the end of the tone processing module increases power consumption and logic area of the GNSS receiver.

Typically, the uncompensated IF at the output of the tone processing module is handled by the global navigation satellite system (GNSS) receiver by changing the intermediate frequency of the intermediate frequency data by an amount equal to the frequency-shift using an IF frequency down-conversion stage. Consider an example of a normal operation of the GNSS receiver without any continuous wave interference tones. In this scenario, the intermediate frequency data is at a certain frequency $f_0$. However, when the continuous wave interference tone is removed using the tone processing module, the intermediate frequency data is shifted to another frequency, $f_0 + df$. $df$ is equal to the frequency of the last continuous wave interference tone that is being mitigated by the tone processing module. The new frequency of the intermediate frequency data will be precisely known and in the GNSS receiver if the intermediate frequency data frequency is programmed as $f_0 + df$ instead of $f_0$ to avoid use of the frequency shift compensation circuit at the end of the tone processing module.

Typically, in global navigation satellite system (GNSS) receivers, on removal of continuous wave interference tones from a received down converted GNSS signal, a rotation of phase of the received down converted GNSS signal occurs. The amount of the phase rotation is given by a phase difference between the received down converted GNSS signal and the continuous wave interference tone that is being removed. If the phase rotation is left uncompensated, the tracking channels of the GNSS receivers present a faulty interpretation of location data gathered by the acquisition engine of the GNSS receivers. The tracking channels consider the uncompensated phase rotation in the received down converted GNSS signal also as a phase change in received down converted GNSS signal along with actual phase change of the received down converted GNSS signal. The tracking channels end up in performing either over-correction or under-correction of the phase of the received down converted GNSS signal which affects the tracking performance of GNSS receivers. Therefore, the introduced phase rotation has to be compensated before transmission to track channels of the GNSS receivers.

Hence, there is a long felt but unresolved need for a tones processing system and a method for detecting and removing one or more continuous wave interference tones from N samples of intermediate frequency data in the received down converted global navigation satellite system (GNSS) signal with reduced logic area and power consumption. Moreover, there is a need for a system and a method for detecting the continuous wave interference tones in reduced time with improved accuracy. Furthermore, there is a need for a system and a method for compensating for a frequency shift and a phase rotation in the N samples of the intermediate frequency data in the received down converted GNSS signal when one or more continuous wave interference tones is removed.

SUMMARY OF THE INVENTION

This summary is provided to introduce a selection of concepts in a simplified form that are further disclosed in the detailed description of the invention. This summary is not intended to determine the scope of the claimed subject matter.

The tones processing system of a global navigation satellite system (GNSS) receiver disclosed herein addresses the above stated need for detecting and removing one or more continuous wave interference tones from N samples of intermediate frequency data in the received down converted GNSS signal with reduced logic area and power consumption. Moreover, the tones processing system of the GNSS receiver disclosed herein detects the continuous wave interference tones in reduced time with improved accuracy. Furthermore, the tones processing system of the GNSS receiver compensates for a frequency shift and a phase rotation in the N samples of the intermediate frequency data in the received down converted GNSS signal when the continuous wave interference tones is removed. The tones processing system processes all the N samples of the intermediate frequency data with a latency that does not affect performance of the GNSS receiver without omitting any of the N samples.

The tones processing system disclosed herein comprises an interference tone determination module, an interference tone tracker operably connected to the interference tone determination module, an interference tone removal module, and an interference tone removal module operably connected to the interference tone determination module and the interference tone tracker. The interference tone determination module sequentially searches for the continuous wave interference tones in the N samples of the intermediate frequency data within a programmable signal frequency band in each of M search iterations. The interference tone tracker operably connected to the interference tone determination module and an interference tone removal module tracks the continuous wave interference tones, detected by the interference tone determination module, with corresponding tone frequencies in the programmable signal frequency band from the N samples of the intermediate frequency data. The interference tone removal module operably connected to the interference tone determination module and the interference tone tracker removes the continuous wave interference tones, tracked by the interference tone tracker, with corresponding tone frequencies in the programmable signal frequency band from the N samples of the intermediate frequency data.

The interference tone determination module comprises a first mixer, a first signal generator, an integrate and dump filter, and an interference tone detection module. The first mixer receives and mixes the N samples of the intermediate frequency data with a first local carrier signal of a programmable carrier frequency to generate an intermediate frequency shifted digital signal comprising intermediate frequency shifted components within the programmable signal frequency band, corresponding to the N samples of the intermediate frequency data. The first signal generator generates the first local carrier signal of the programmable carrier frequency for a programmable sweep rate associated with each of M search iterations. The integrate and dump filter is operably connected to the first mixer. The integrate and dump filter generates accumulated frequency components corresponding to the N samples of the intermediate frequency data by accumulating and dumping the intermediate frequency shifted components of the generated intermediate frequency shifted digital signal corresponding to the N samples of the intermediate frequency data for the programmable sweep rate. The interference tone detection module comprising a first amplitude estimator, a threshold comparator, and a peak detector operably connected to the integrate and dump filter. The interference tone detection module detects the continuous wave interference tones with corresponding tone frequencies within the programmable signal frequency band and with amplitudes greater than a programmable threshold, in one or more of the accumulated frequency components corresponding to the N samples of the intermediate frequency data.

The interference tone determination module transmits corresponding tone frequencies of the detected continuous wave interference tones to a global navigation satellite system (GNSS) baseband processor of the GNSS receiver for tracking the detected continuous wave interference tones with the corresponding tone frequencies within the programmable signal frequency band in the N samples of the intermediate frequency data. In an embodiment, the tones processing system comprises an interference tone tracker operably connected to the interference tone determination module and the interference tone removal module for tracking the detected continuous wave interference tones and transmitting corresponding tone frequencies of the tracked continuous wave interference tones and a tone phase of each of the tracked continuous wave interference tones to the interference tone removal control unit and the GNSS baseband processor for facilitating removal of the tracked continuous wave interference tones with the corresponding tone frequencies within the programmable signal frequency band and with amplitudes greater than the programmable threshold from the N samples of the intermediate frequency data.

The interference tone tracker operably connected to the interference tone determination module and the interference tone removal module tracks the detected continuous wave interference tones with the corresponding tone frequencies within the programmable signal frequency band and with the amplitudes greater than the programmable threshold, from the N samples of the intermediate frequency data. The interference tone tracker further estimates a tone phase of each of the tracked continuous wave interference tones. The interference tone tracker comprises one or more interference tone tracking units corresponding to the number of the detected continuous wave interference tones with corresponding tone frequencies.

The interference tone removal module operably connected to the interference tone determination module and the interference tone tracker removes the tracked continuous wave interference tones with the corresponding tone frequencies within the programmable signal frequency band and with the amplitudes greater than the programmable threshold, from the N samples of the intermediate frequency data. The interference tone removal module comprises one or more interference tone removal units corresponding to the tracked continuous wave interference tones cascaded to each other. Each of the interference tone removal units comprises a second signal generator, a second mixer, a tone filter, and a quantizer. The second signal generator generates a second local carrier signal with a computed initial phase corresponding to each of the tracked continuous wave interference tones with the corresponding tone frequencies. The second local carrier signal comprises a resultant tone cancelling frequency that is determined from a corresponding tone frequency of each of the tracked continuous wave interference tones. The second local carrier signal further comprises a tone cancelling frequency of a second local carrier signal generated by a preceding interference tone removal unit.

The second mixer operably connected to the second signal generator mixes the generated second local carrier signal with N samples of the intermediate frequency data or an output of the preceding interference tone removal unit for generating a tone frequency shifted digital signal comprising tone filter shifted frequency components corresponding to the N samples of the intermediate frequency data. A tone filter comprising an amplitude estimator and a subtractor, operably connected to the second mixer, suppresses the generated tone filter shifted frequency components corresponding to the N samples of the intermediate frequency data, with frequencies corresponding to a predetermined tone filter suppression frequency, to generate a tone suppressed output signal comprising the suppressed tone filter shifted frequency components, free of the tracked continuous wave interference tones.

The quantizer operably connected to the tone filter quantizes the generated tone suppressed output signal free of the tracked continuous wave interference tones. The quantizer reduces the number of processing bits in the generated tone suppressed output signal using bit truncation and rounding of an integer value of the generated tone suppressed output signal to a nearest quantized integer value.

When a continuous wave interference tone is removed by the interference tone removal module, a phase rotation equal to a difference between the phase of N samples of the intermediate frequency data and the tone phase of the removed continuous wave interference tone is introduced in the N samples of the intermediate frequency data due to different time instants of detection of the continuous wave interference tones by the interference tone determination module and different time instants of generation of the second local carrier signals in the interference tone removal units of the interference tone removal module. The interference tone removal module compensates the phase rotation by computing an initial phase of the second local carrier signal for removing the continuous wave interference tones apart from a first continuous wave interference tone using the time instant of generation of the second local carrier signal for removing the continuous wave interference tones relative to the time instant of generation of the second local carrier signal for removing the first continuous wave interference tone. The interference tone removal control unit of the interference tone removal module initializes the second signal generator of each of the interference tone removal unit with the computed initial phase. The second local carrier signals that are generated are replica of the continuous wave interference tones and have a zero phase difference with the intermediate frequency data. In an embodiment, the interference tone removal control unit configures the second signal generators to start generating the second local carrier signals at the same time instant with the computed initial phase of zero to compensate for the phase rotation.

In one or more embodiments, related systems comprise circuitry and/or programming for affecting the methods disclosed herein. The circuitry and/or programming can be any combination of hardware, software, and/or firmware configured to affect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or component referenced by a numeral in a drawing is applicable to the description of that method step or component shown by that same numeral in any subsequent drawing herein.

DETAILED DESCRIPTION OF THE INVENTION

Figure 1A:
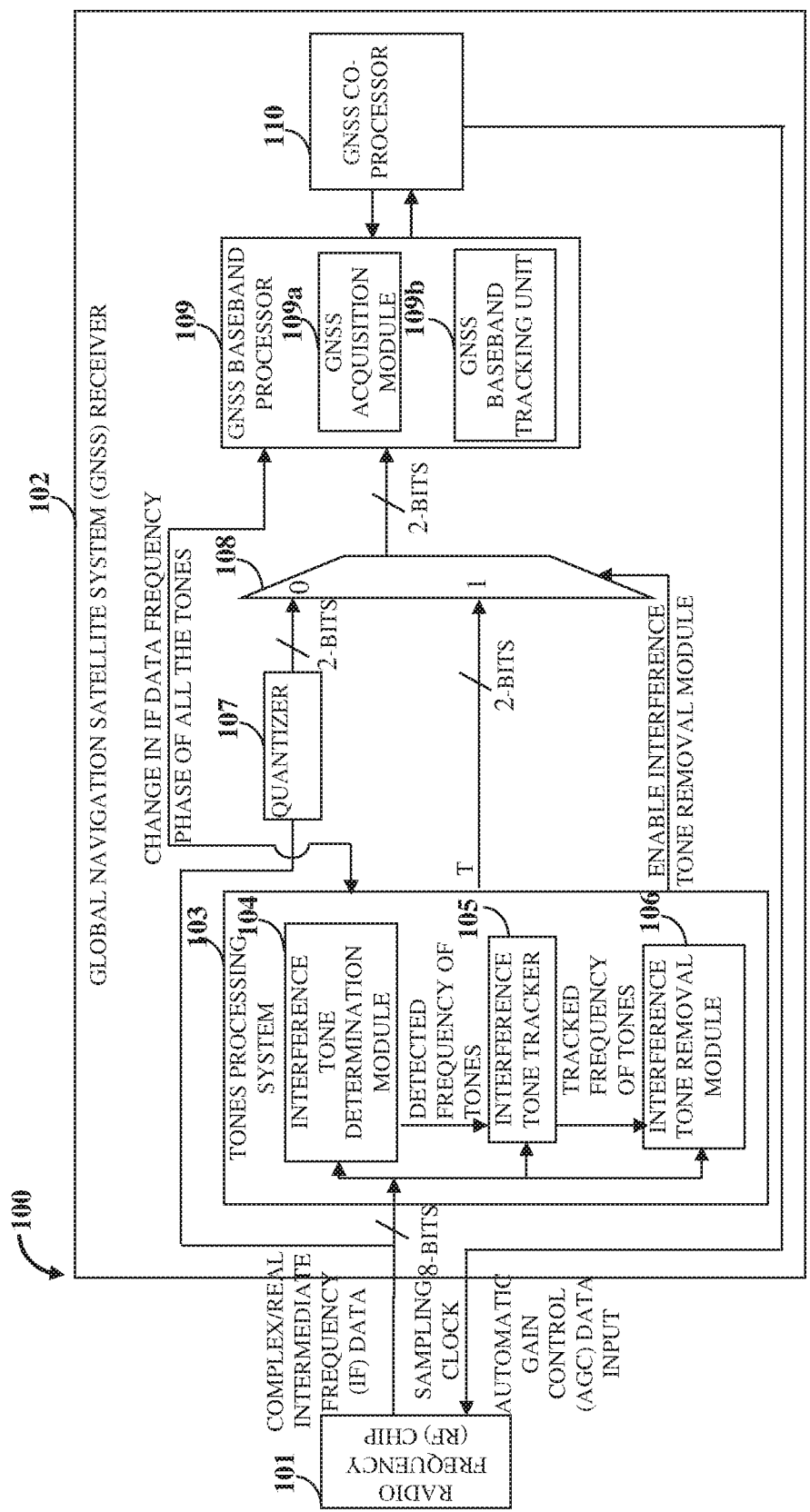
FIGS. 1A-1C exemplarily illustrate a system comprising a tones processing system integrated in a global navigation satellite system receiver for detecting and removing one or more continuous wave interference tones from N samples of intermediate frequency data.
Figure 1B:
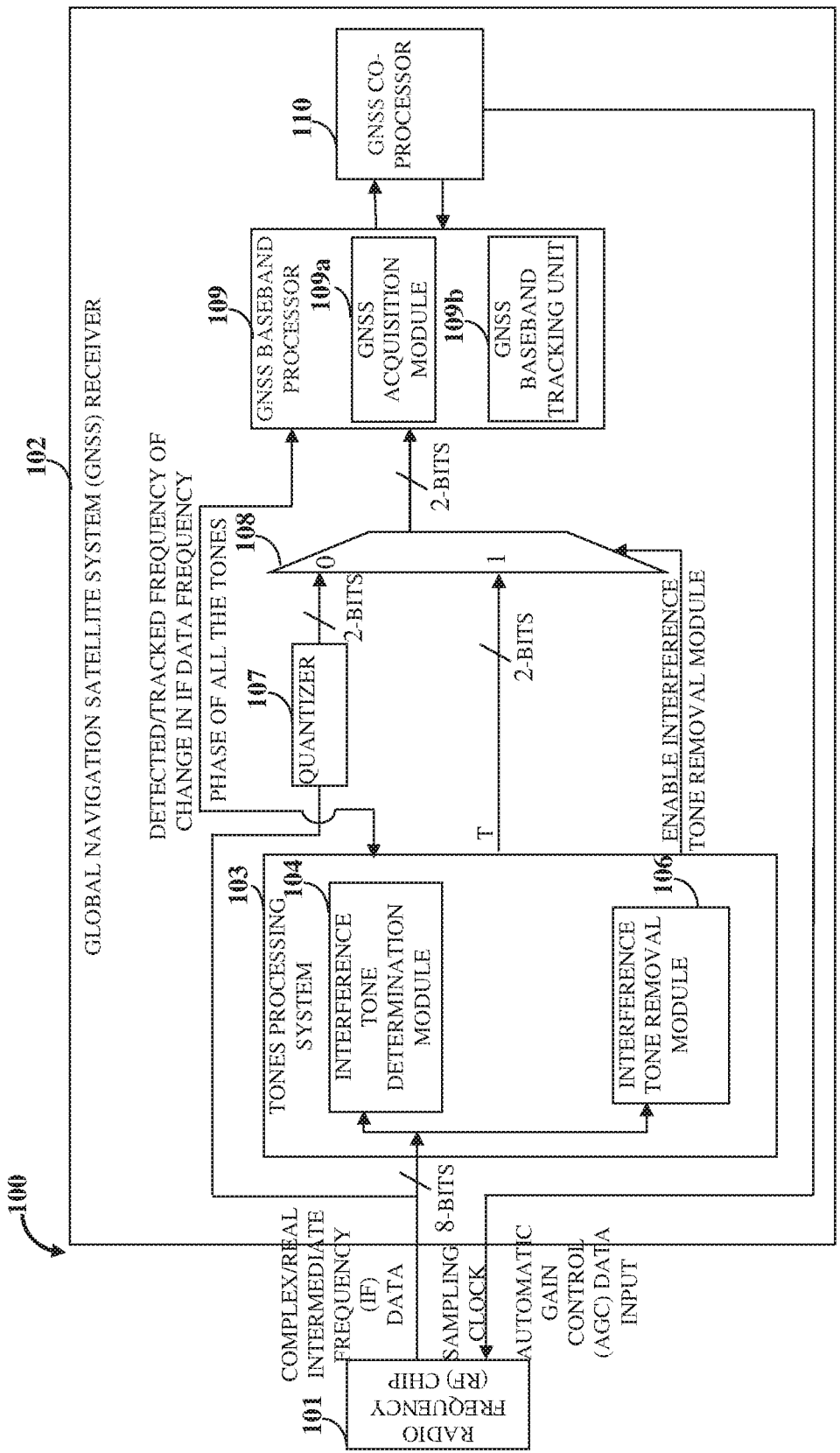
Figure 1C:
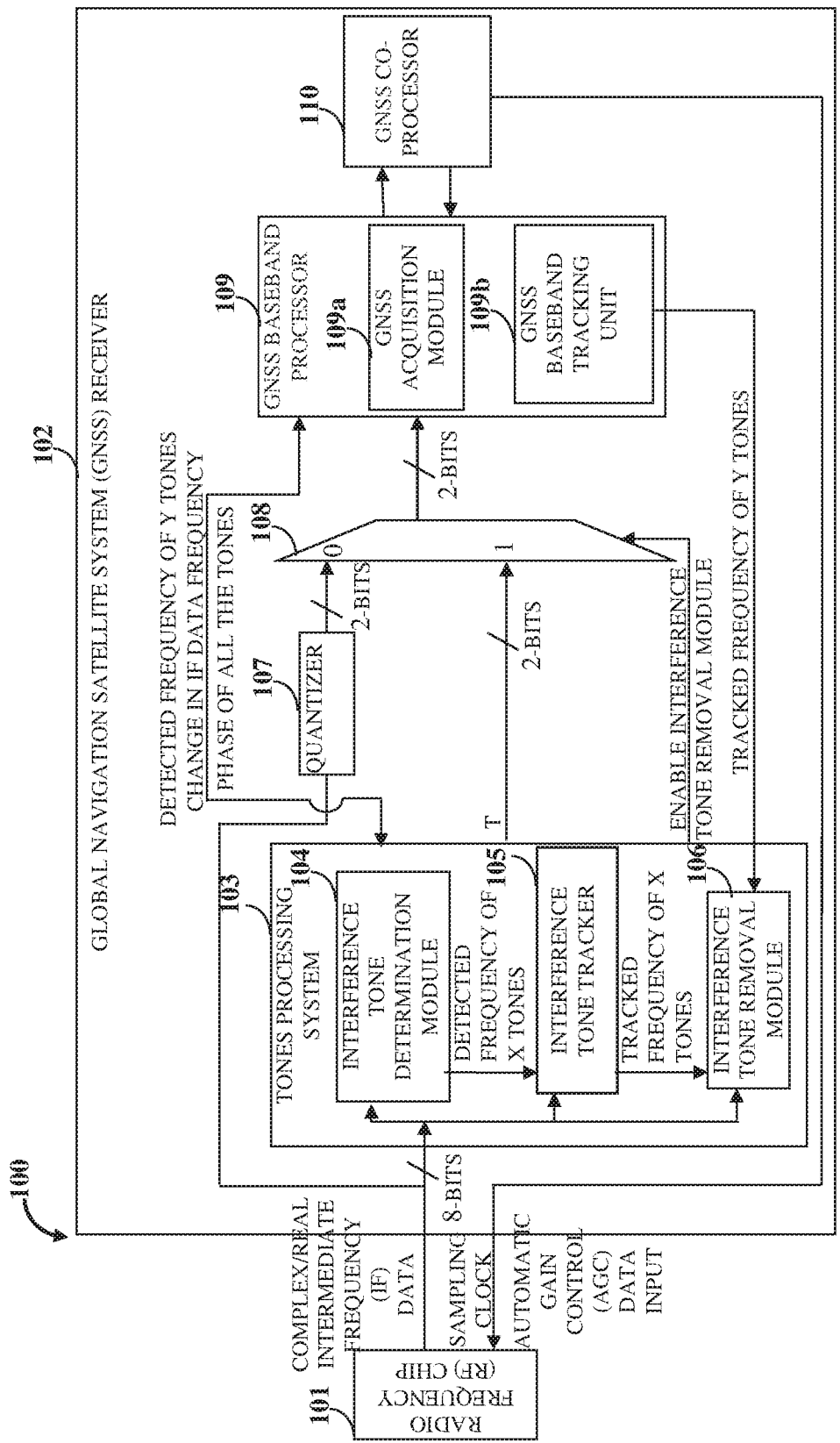

FIGS. 1A-1C exemplarily illustrate a system 100 comprising a tones processing system 103 integrated in a global navigation satellite system (GNSS) receiver 102 for detecting and removing one or more continuous wave interference tones from N samples of intermediate frequency. The GNSS receiver 102 is used for acquiring and tracking multiple GNSS signals. As used herein, a "global navigation satellite system signal" refers to a navigation signal transmitted by a satellite in a GNSS constellation. For example, a global positioning system (GPS) satellite transmits GPS signals in one of L1, L2, and L5 frequency bands. The GNSS receiver 102 receives a GNSS signal and acquires the received GNSS signal, if the received GNSS signal is the same as the GNSS signal programmed for acquisition. The GNSS signal received by the GNSS receiver 102 comprises a complex signal and/or a real signal having a frequency range of, for example, about 1151 megahertz (MHz) to about 2492 MHz. A radio frequency (RF) chip 101 down converts the received GNSS signal to an intermediate frequency signal. As used herein, "intermediate frequency signal" refers to a down converted GNSS signal. The RF chip 101 comprises an analog-to-digital converter (ADC) (not shown) that samples the IF signal at a sampling rate or a sampling frequency, that is, $f_s$ megahertz (MHz) for generating N samples of intermediate frequency data using a sampling clock. The output of the RF chip 101 is the digitized N samples of intermediate frequency data comprising in-phase components and quadrature phase components of 8 bits each. The N samples of the intermediate frequency data comprise complex intermediate frequency data or real intermediate frequency data. The RF chip 101 accepts the sampling clock and a data input to control an automatic gain control (AGC) circuit within the RF chip 101. There is no control or limitation on the signal bandwidths that can be received by the RF chip 101. The GNSS receiver 102 comprises the tones processing system 103, a GNSS baseband processor 109, and a GNSS co-processor 110. The GNSS co-processor 110 generates the data input to control the automatic gain control (AGC) circuit in the RF chip 101. The GNSS baseband processor comprises a GNSS acquisition module 109a and a GNSS baseband tracking unit 109b. The GNSS acquisition module 109a performs a search for the intermediate frequency data in the received GNSS signal and assesses whether the intermediate frequency data is present or not. The GNSS baseband tracking unit 109b performs tracking of the intermediate frequency data to decode and generate a navigation message accurately.

The radio frequency (RF) chip 101 transmits the N samples of the intermediate frequency data to the global navigation satellite system (GNSS) receiver 102 for further processing in the tones processing system 103, the GNSS baseband processor 109, and the GNSS co-processor 110. The N samples of the intermediate frequency data may comprise one or more continuous wave interference tones. As used herein, "continuous wave interference tones" refer to frequency components of an unwanted signal that is part of the N samples of the intermediate frequency data in a signal frequency band of the received GNSS signal. These continuous wave interference tones are, for example, jamming signals from illegal jammers, radio beacons from a radio navigation aid assisting airplanes to navigate, radio amateur bands, etc. Also, as used herein, "frequency components" refer to parts of a spectrum of the received GNSS signal with different magnitudes and phases. The different frequency components have corresponding magnitudes or amplitudes and phases. The tones processing system 103 comprising an interference tone determination module 104, an interference tone tracker 105, and an interference tone removal module 106 detects and removes the continuous wave interference tones in the N samples of the intermediate frequency data as disclosed in the detailed description of FIG. 2 and FIG. 4 and transmit a tone suppressed digital signal with the intermediate frequency data to the GNSS baseband processor 109. The tones processing system 103 detects and removes the continuous wave interference tones and transmits a change in frequency of the intermediate frequency data due to the removal of the continuous wave interference tones in the N samples of the intermediate frequency data and phase corresponding to the continuous wave interference tones, hereafter referred to as "tone phase", to the GNSS baseband processor 109. The interference tone determination module 104 transmits the frequency of the detected continuous wave interference tones, hereafter referred to as, "tone frequency" to the interference tone tracker 105.

As exemplarily illustrated in FIG. 1A, the interference tone tracker 105 is within the tones processing system 103. The interference tone determination module 104 transmits the tone frequencies of the detected continuous wave interference tones to the interference tone tracker 105. The interference tone tracker 105 comprises one or more interference tone tracking units (not shown) based on the number of the detected continuous wave interference tones with corresponding tone frequencies.

If the tone frequencies of the detected continuous wave interference tones are not varying, the interference tone tracker 105 comprises only one interference tone tracking unit that is multiplexed for tracking the detected continuous wave interference tones. In an embodiment, the interference tone tracker 105 comprises multiple parallel interference tone tracking units to track the detected continuous wave interference tones respectively with finer resolution. A dedicated number of interference tone tracking units in the interference tone tracker 105 are used to track the detected continuous wave interference tones with corresponding tone frequencies. The interference tone tracker 105 transmits the tone frequencies and the tone phases of the tracked continuous wave interference tones to an interference tone removal control unit of the interference tone removal module 106. The interference tone tracker 105 transmits change in frequency, that is, a frequency shift of the N samples of the intermediate frequency data and the tone phases of the removed continuous wave interference tones to the GNSS baseband processor 109 of the GNSS receiver 102.

In an embodiment of the global navigation satellite system (GNSS) receiver 102 exemplarily illustrated in FIG. 1B, the GNSS baseband tracking unit 109b in the GNSS baseband processor 109 of the GNSS receiver 102 tracks the detected continuous wave interference tones in parallel using multiple GNSS baseband tracking channels. The interference tone tracker 105 is absent from the tones processing system 103 as exemplarily illustrated in FIG. 1B. The interference tone determination module 104 transmits the tone frequencies to the GNSS baseband processor 109 for tracking the detected continuous wave interference tones with the corresponding frequencies within the programmable signal frequency band in the N samples of the intermediate frequency data. A dedicated number of the GNSS baseband tracking channels of the GNSS baseband tracking unit 109b function as the interference tone tracking units in tracking the detected continuous wave interference tones. In this embodiment, the GNSS baseband tracking unit 109b transmits tone frequencies and tone phases of the tracked continuous wave interference tones to the interference tone removal module 106. The interference tone removal module 106 removes the tracked continuous wave interference tones and transmits the change in frequency of the intermediate frequency data and the tone phases of the removed continuous wave interference tones to the GNSS baseband processor 109 of the GNSS receiver 102.

In another embodiment of the GNSS receiver 102 exemplarily illustrated in FIG. 1C, a few, for example, X number of the detected continuous wave interference tones are tracked by the interference tone tracker 105 within the tones processing system 103 and the remaining few, for example, Y number of the detected continuous wave interference tones are tracked by the GNSS baseband tracking unit 109b of the GNSS baseband processor 109 resulting in tracking of X+Y number of continuous wave interference tones. X number of the interference tone tracking units of the interference tone tracker 105 track the X number of the detected continuous wave interference tones with corresponding tone frequencies and Y number of the GNSS baseband tracking channels of the GNSS baseband tracking unit 109b track the Y number of the detected continuous wave interference tones with corresponding tone frequencies. The interference tone determination module 104 transmits the tone frequencies of the detected continuous wave interference tones to the interference tone tracker 105 and the GNSS baseband processor 109. In this embodiment, the interference tone tracker 105 transmits tone frequencies and tone phases of the X tracked continuous wave interference tones to the interference tone removal module 106 and the GNSS baseband tracking unit 109b transmits tone frequencies and tone phases of the Y tracked continuous wave interference tones to the interference tone removal module 106. The interference tone removal module 106 removes the tracked continuous wave interference tones and transmits change in frequency of the intermediate frequency data and the tone phases of the removed continuous wave interference tones to the GNSS baseband processor 109 of the GNSS receiver 102.

In an embodiment, the GNSS receiver 102 bypasses the interference tone removal module 106 in the tones processing system 103 and transmits the N samples of the intermediate frequency data with the continuous wave interference tones to the GNSS baseband processor 109 after quantizing the number of processing bits in the N samples of the intermediate frequency data to 2 bits using a quantizer 107. A multiplexer 108 in the GNSS receiver 102 selects either the output of the tones processing system 103 or the output of the quantizer 107 to be transmitted to the GNSS baseband processor 109. The tones processing system 103 activates select line "Enable Interference Tone Removal Module" of the multiplexer 108. The GNSS baseband processor 109 along with the GNSS co-processor 110 perform the operations of tracking the tone suppressed digital signal free of the continuous wave interference tones to obtain location data accurately.

Figure 2:
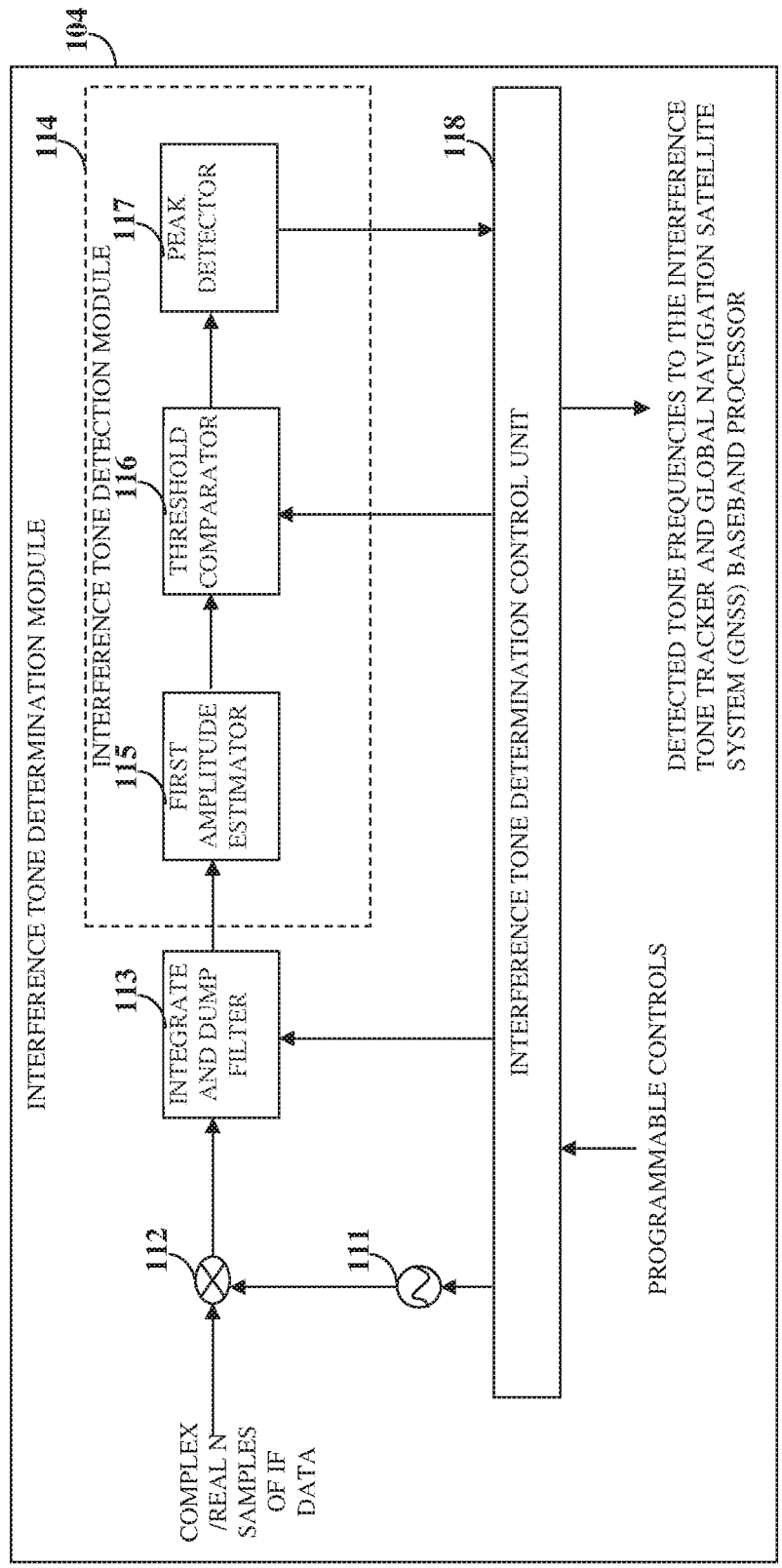
FIG. 2 exemplarily illustrates an interference tone determination module of the tones processing system for sequentially searching for one or more continuous wave interference tones.

FIG. 2 exemplarily illustrates an interference tone determination module 104 of the tones processing system 103 for sequentially searching for one or more continuous wave interference tones. The interference tone determination module 104 sequentially searches for the continuous wave interference tones in the N samples of the intermediate frequency data within a programmable signal frequency band in each of M search iterations. The interference tone determination module 104 comprises a first signal generator 111, a first mixer 112, an integrate and dump filter 113 operably connected to the first mixer 112, an interference tone detection module 114 operably connected to the integrate and dump filter 113, and an interference tone determination control unit 118. The first signal generator 111 generates a first local carrier signal of a programmable carrier frequency for a programmable sweep rate associated with each of the M search iterations. As used herein, "sweep rate" refers to a rate at which the programmable signal frequency band with the N samples of the intermediate frequency data is sequentially searched for the continuous wave interference tones in each of the M search iterations. The interference tone determination module 104 searches the N samples of the intermediate frequency data for the presence of continuous wave interference tones in the M search iterations in the programmable signal frequency band. The unit of sweep rate is Hz/minute. The first mixer 112 receives the N samples of the intermediate frequency data and mixes the received N samples of the intermediate frequency data with the first local carrier signal to generate an intermediate frequency shifted digital signal comprising intermediate frequency shifted components corresponding to the N samples of the intermediate frequency data within the programmable signal frequency band.

The integrate and dump filter 113 generates accumulated frequency components corresponding to the N samples of the intermediate frequency data by accumulating and dumping the frequency components of the generated intermediate frequency shifted digital signal corresponding to the N samples of intermediate frequency data for the programmable sweep rate. The integrate and dump filter 113 integrates the intermediate frequency shifted digital signal for the programmable sweep rate. The programmable sweep rate defines the step size of a search iteration in searching for the continuous wave interference tones in a programmed signal frequency band.

The interference tone detection module 114 detects the continuous wave interference tones with corresponding tone frequencies within the programmable signal frequency band and with amplitudes greater than a programmable threshold, in one or more accumulated frequency components corresponding to the N samples of the intermediate frequency data using a first amplitude estimator 115, a threshold comparator 116, and a peak detector 117. The first amplitude estimator 115 is operably connected to the integrate and dump filter 113, the threshold comparator 116 is operably connected to the first amplitude estimator 115, and the peak detector 117 is operably connected to the threshold comparator 116 as exemplarily illustrated in FIG. 2. The first amplitude estimator 115 computes amplitudes of the accumulated frequency components corresponding to the N samples of the intermediate frequency data. The threshold comparator 116 compares the computed amplitudes of the accumulated frequency components corresponding to the N samples of the intermediate frequency data with a programmable threshold and determines the accumulated frequency components indicative of continuous wave interference tones with corresponding tone frequencies, for example, Z accumulated frequency components in the programmable signal frequency band. The peak detector 117 detects the continuous wave interference tones, for example, B continuous wave interference tones with the corresponding tone frequencies in the programmable signal frequency band by selecting one or more accumulated frequency components, for example, B accumulated frequency components with the computed amplitudes greater than the computed amplitudes of the remaining accumulated frequency components, for example, Z−B accumulated frequency components that are indicative of the continuous wave interference tones. The peak detector 117 arranges the B accumulated frequency components in a descending order of the computed amplitudes. The accumulated frequency components are provided to the interference tone determination control unit 118 of the interference tone determination module 104 for performing the next search iteration in the M search iterations for a further finer search for the continuous wave interference tones.

Figure 3:
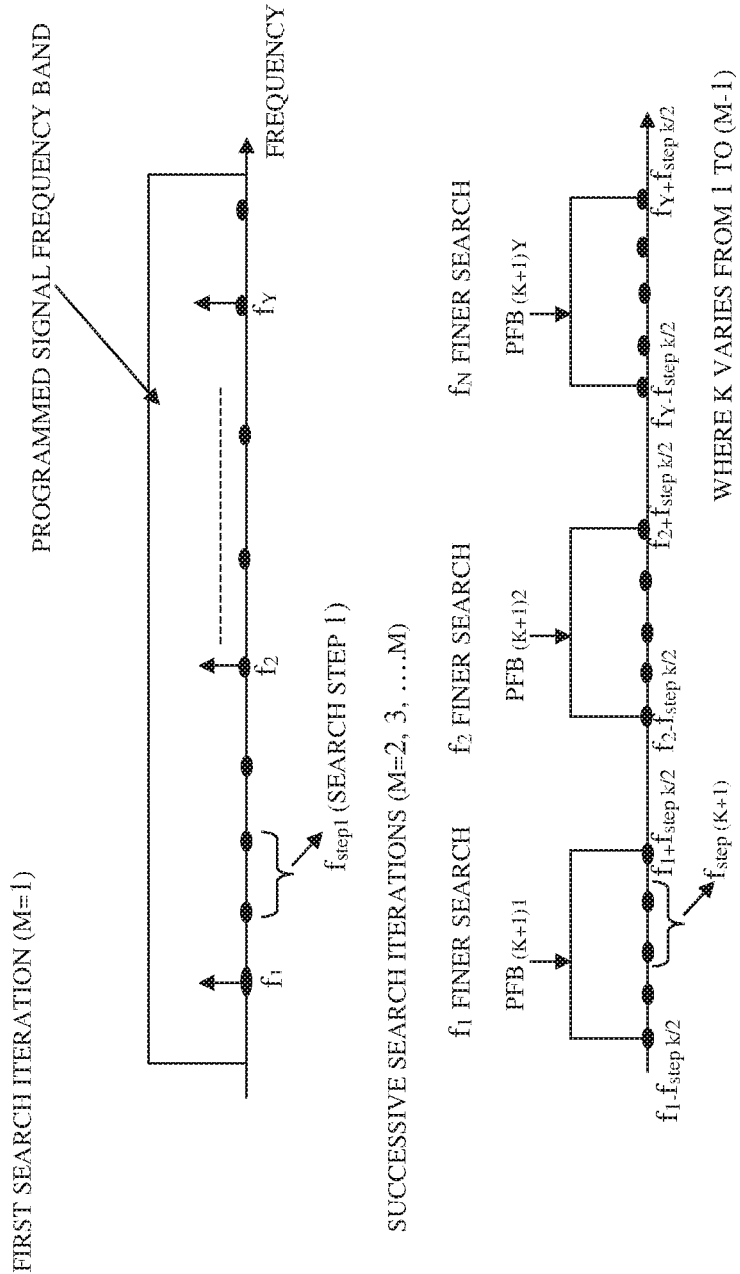
FIG. 3 exemplarily illustrates a schematic diagram showing search iterations performed by the interference tone determination module of the tones processing system in a programmable signal frequency band of the N samples of the intermediate frequency data for detecting one or more continuous wave interference tones.

The interference tone determination control unit 118 of the interference tone determination module 104 is operably connected to the first signal generator 111, the integrate and dump filter 113, and the interference tone detection module 114 for configuring the programmable signal frequency band, the programmable carrier frequency, the programmable sweep rate, and the programmable threshold as disclosed in the detailed description of FIG. 3. With the iterative wider to narrow search for the continuous wave interference tones, the interference tone determination module 104 detects the continuous wave interference tones in a lesser period of time compared to a single search iteration for detecting the continuous wave interference tones. In an embodiment, the number of search iterations is 1, that is, M is equal to 1. In this embodiment, the interference tone determination module 104 detects the continuous wave interference tones in a single search iteration. In an embodiment, the interference tone determination module 104 uses a dual frequency correlator for detecting the continuous wave interference tones in a single search iteration, if the programmable signal frequency band is symmetrical around zero frequency.

In an embodiment, to speed up the detection of the continuous wave interference tones, the tones processing system 103 has multiple parallel interference tone determination modules and the programmable signal frequency band of the N samples of the intermediate frequency data to be searched for the continuous wave interference tones is divided into multiple programmable signal frequency bands corresponding to the parallel interference tone determination modules. In this embodiment, each of the interference tone determination modules is programmed with the divided programmable signal frequency band. Consider an example where a programmable signal frequency band PFB from 0 to 20 MHz is to be searched by 4 parallel interference tone determination modules. The interference tone determination control unit 118 divides the programmable signal frequency band PFB into 4 signal frequency bands $PFB_1$ with frequencies ranging between 0 MHz to 5 MHz, $PFB_2$ with 5 MHz to 10 MHz, $PFB_3$ with 10 MHz to 15 MHz and $PFB_4$ 15 MHz to 20 MHz. On performing a parallel search for the continuous wave interference tones, the total time taken for detection of the continuous wave interference tones is reduced by a ¼ of the total time taken for the detection of the continuous wave interference tones by a single interference tone determination module 104. In an embodiment, the ratio of dividing the programmable signal frequency band into multiple programmable signal frequency bands is either equal or unequal.

The interference tone determination module 104 transmits a frequency shift of the N samples of the intermediate frequency data and a tone phase of each of the detected continuous wave interference tones to the interference tone tracker 105 and the global navigation satellite system (GNSS) baseband processor 109 for removing the detected continuous wave interference tones with the corresponding tone frequencies within the programmable signal frequency band from the N samples of the intermediate frequency data.

FIG. 3 exemplarily illustrates a schematic diagram showing search iterations performed by the interference tone determination module 104 of the tones processing system 103 in a programmable signal frequency band of the N samples of the intermediate frequency data for detecting one or more continuous wave interference tones. The interference tone determination control unit 118 of the interference tone determination module 104 programs the programmable signal frequency band, for example, $PFB_1$, $PFB_2$, ..., $PFB_M$, the frequency step, for example, $fstep_1$, $fstep_2$, ..., $fstep_M$, the programmable sweep rate, for example, $ts_1$, $ts_2$, ..., $ts_M$, and the programmable threshold, for example, $th_1$, $th_2$, ..., $th_M$ for each of the M search iterations.

In a first search iteration, the interference tone determination control unit 118 programs the programmable signal frequency band to be $PFB_1$, the programmable step size to be $fstep_1$, the programmable sweep rate to be $ts_1$, and the programmable threshold is $th_1$. For the programmed signal frequency band $PFB_1$, integrate and dump filter 113 generates accumulated frequency components by sweeping with the programmed step size $fstep_1$ at the programmed sweep rate $ts_1$. The number of the accumulated frequency components generated in the first iteration is $X_1$=floor($PFB_1$/$fstep_1$)+1, that is, the integer part of the quotient of the ($PFB_1$/$fstep_1$)+1. The first amplitude estimator 115 of the interference tone detection module 114 computes amplitudes of the X accumulated frequency components. The threshold comparator 116 compares the computed amplitudes of the X accumulated frequency components with the programmed threshold $th_1$. Out of the X accumulated frequency components, the threshold comparator 116 determines Z accumulated frequency components indicative of continuous wave interference tones with corresponding tone frequencies in the programmed signal frequency band $PFB_1$. Out of the Z accumulated frequency components, the peak detector 117 detects the Y continuous wave interference tones with the corresponding tone frequencies in the programmed signal frequency band $PFB_1$ by selecting Y accumulated frequency components with the computed amplitudes greater than the computed amplitudes of the remaining Z-Y accumulated frequency components that are also indicative of the continuous wave interference tones.

The peak detector 117 detects the Y continuous wave interference tones with tone frequencies $f_1$, $f_2$, ..., $f_Y$ and transmits the tone frequencies $f_1$, $f_2$, ..., $f_Y$ to the interference tone determination control unit 118 for performing a next iteration for further finer tone frequency search for the continuous wave interference tones. Each of the M−1 successive iterations are the same as the first iteration except that the search of the continuous wave interference tones is by sweeping with a programmed finer frequency step $fstep_{k+1}$ across the Y frequencies $(PFB_{(k+1)1})$, $(PFB_{(k+1)2})$ ... $((PFB_{(k+1)Y})$ which are obtained from the preceding iteration as follows:

$$(f_1-fstep_k/2 \text{ to } f_1+fstep_k/2), (f_2-fstep_k/2 \text{ to } f_2+fstep_k/2) \ldots (f_Y-fstep_k/2 \text{ to } f_Y+fstep_k/2)$$

where, k varies from 1 to M−1.

At the end of the $M^{th}$ iteration, the Y detected continuous wave interference tones with corresponding tone frequencies with an error of +/−$fstep_M$/2 are provided to the interference tone tracker 105, the interference tone removal module 106, and the global navigation satellite system (GNSS) baseband processor 109 for further processing.

Consider an example of a programmable signal frequency band $PFB_1$ ranging from −16 MHz to +16 MHz for detecting one or more continuous wave interference tones in N samples of intermediate frequency data in M=4 search iterations by the interference tone determination module 104 of the tones processing system 103. The interference tone determination control unit 118 of the interference tone determination module 104 programs the frequency step as $fstep_1$=100 KHz, $fstep_2$=10 KHz, $fstep_3$=1 KHz, and $fstep_4$=100 Hz, and a programmed threshold is $th_1$, $th_2$, $th_3$, and $th_4$ for each of the 4 search iterations. Consider $X_1$, $X_2$, $X_3$, $X_4$ to be the number of accumulated frequency components searched by the interference tone determination module 104 and $Z_1$, $Z_2$, $Z_3$, $Z_4$ be the number of accumulated frequency components with amplitudes greater than the programmed threshold $th_1$, $th_2$, $th_3$, and $th_4$ respectively in the $1^{st}$, $2^{nd}$, $3^{rd}$ and $4^{th}$ iteration respectively.

In the $1^{st}$ search iteration, the number of accumulated frequency components $X_1$ searched by the interference tone determination module 104 is $X_1=(PFB_1/fstep_1)+1=(32$ MHz/100 KHz)+1=321. Out of the $X_1=321$ accumulated frequency components, the threshold comparator 116 of the interference tone determination module 104 determines amplitudes of $Z_1=2$ accumulated frequency components, that are indicative of the continuous wave interference tones, are greater than the programmed threshold $th_1$. The peak detector 117 detects tone frequencies of the 2 accumulated frequency components to be $f_1=-5$ MHz and $f_2=2$ MHz. The peak detector 117 provides the detected tone frequencies to the interference tone determination module 104 for performing the second search iteration. The tone frequencies $f_1$ and $f_2$ detected in the first search iteration have an uncertainty of +/−50 KHz, that is, +/−$fstep_1/2$.

In the second search iteration, the interference tone determination control unit 118 programs the signal frequency bands $PFB_{21}=f_1-fstep_1/2$ to $f_1+fstep_1/2$ to be −5.05 MHz to −4.95 MHz and the $PFB_{22}=f_2-fstep_1/2$ to $f_2+fstep_1/2$ to be 1.95 MHz to 2.05 MHz. The search in the programmed signal frequency bands $PFB_{21}$ and $PFB_{22}$ for the continuous wave interference tones is narrowed down to $fstep_2=1.0$ KHz. The number of accumulated frequency components searched in the second search iteration is $X_2=PFB_{21}/fstep_2+1+PFB_{22}/fstep_2+1=10+1+10+1=22$ or $X_2=Z_1*(fstep_1/fstep_2)+Z_1=22$. Out of the $X_2=22$ accumulated frequency components, the threshold comparator 116 of the interference tone determination module 104 determines amplitudes of $Z_2=2$ accumulated frequency components, that are indicative of the continuous wave interference tones, are greater than the programmed threshold $th_2$. The peak detector 117 detects tone frequencies of the 2 accumulated frequency components to be $f_1=-5.03$ MHz and $f_2=2.04$ MHz. The peak detector 117 provides the detected tone frequencies to the interference tone determination module 104 for performing third search iteration. The tone frequencies $f_1$ and $f_2$ detected in the second search iteration have an uncertainty of +/−5 KHz, that is, +/−$fstep_2/2$.

In the third search iteration, the interference tone determination control unit 118 programs the signal frequency bands $PFB_{31}=f_1-fstep_2/2$ to $f_1 30 fstep_2/2$ to be −5.035 MHz to −5.025 MHz and the $PFB_{32}=f_2-fstep_2/2$ to $f_2+fstep_2/2$ to be 2.035 MHz to 2.045 MHz. The search in the programmed signal frequency bands $PFB_{31}$ and $PFB_{32}$ for the continuous wave interference tones is narrowed down to fstep3=1 KHz. The number of accumulated frequency components searched in the third search iteration is $X_3=PFB_{31}/fstep_3+1+PFB_{32}/fstep_3+1=10+1+10+1=22$ or $X_3=Z_2*(fstep_2/fstep_3)+Z_2=22$. Out of the $X_3=22$ accumulated frequency components, the threshold comparator 116 of the interference tone determination module 104 determines amplitudes of $Z_3=2$ accumulated frequency components, that are indicative of the continuous wave interference tones, are greater than the programmed threshold $th_3$. The peak detector 117 detects tone frequencies of the 2 accumulated frequency components to be $f_1=-5.03$ MHz and $f_2=2.04$ MHz. The peak detector 117 provides the detected tone frequencies to the interference tone determination module 104 for performing the fourth search iteration. The tone frequencies $f_1$ and $f_2$ detected in the third search iteration have an uncertainty of +/−0.5 KHz, that is, +/−$fstep_3/2$.

In the fourth search iteration, the interference tone determination control unit 118 programs the signal frequency bands $PFB_{41}=f_1-fstep_3/2$ to $f_1+fstep_3/2$ to be −5.0335 MHz to −5.0325 MHz and the $PFB_{42}=f_2-fstep_3/2$ to $f_2+fstep_3/2$ to be 2.0415 MHz to 2.0425 MHz. The search in the programmed signal frequency bands $PFB_{41}$ and $PFB_{42}$ for the continuous wave interference tones is narrowed down to $fstep_4=100$ Hz. The number of accumulated frequency components searched in the fourth search iteration is $X_4=PFB_{41}/fstep_4+1+PFB_{42}/fstep_4+1=10+1+10+1=22$ or $X_4=Z_3*(fstep_3/fstep_4)+Z_3=22$. Out of the $X_4=22$ accumulated frequency components, the threshold comparator 116 of the interference tone determination module 104 determines amplitudes of $Z_4=2$ accumulated frequency components, that are indicative of the continuous wave interference tones, are greater than the programmed threshold $th_4$. The peak detector 117 detects tone frequencies of the 2 accumulated frequency components to be $f_1=-5.0333$ MHz and $f_2=2.0421$ MHz. The peak detector 117 provides the detected tone frequencies $f_1=-5.0333$ MHz and $f_2=2.0421$ MHz to the interference tone removal module 106, or the interference tone tracker 105 or the global navigation satellite system (GNSS) baseband processor 109 of the GNSS receiver 102 for removing the detected continuous wave interference tones with the tone frequencies −5.0333 MHz and 2.0421 MHz. The interference tone determination module 104 detects the continuous wave interference tones with the tone frequencies −5.0333 MHz and 2.0421 MHz with an uncertainty of +/−50 Hz, that is, +/−$fstep_4/2$.

The total time taken to search for the continuous wave interference tones in the four search iterations in the above example is $T_{iterative}=X_1*(1/fstep_1)+X_2*(1/fstep_1)+X_3*(1/fstep_4)+X_4*(1/fstep_4)=321*(1/100$ KHz$)+22*(1/10$ KHz$)+22*(1/1$ KHz$)+22*(1/100$ Hz$)=3.2+2.2+22+220~247.4$ milliseconds.

Therefore, for the M search iterations, $$T_{iterative}=X_1*(1/fstep_1)=X_2*(1/fstep_2)\ldots+X_M*(1/fstep_Y).$$

where, $$X_1=(PFB_1/fstep_1)+1.$$

$$X_2=(PFB_{21}/fstep_2)+1+(PFB_{22}/fstep_2)+1\ldots+(PFB_{2A}/fstep_2)+1.$$

$$X_3=(PFB_{31}/fstep_3)+1+(PFB_{32}/fstep_3)+1\ldots+(PFB_{3B}/fstep_3)+1.$$

$$X_M=(PFB_{M1}/fstep_M)+1+(PFB_{M2}/fstep_M)+1\ldots+(PFB_{MC}/fstep_M)+1.$$

where, $A=Z_1$, $B=Z_2$, and $C=Z_{M-1}$ indicating a varying number of frequency components that are detected in different search iterations.

In an embodiment of the single iteration to search for the continuous wave interference tones with finer resolution of +/−50 Hz with a step size of $fstep_s=100$ Hz for the programmable frequency band, PFB, ranging from −16 MHz to +16 MHz, the number of accumulated frequency components to be searched is $X_{single}=(PFB/fstep_s)=32$ MHz/100 Hz+1~320001. Total time taken to search is $T_{single}=X_{single}*(1/fstep_s)=320001*(1/100$ Hz$)\sim 3200.01$ seconds. Similarly, total time taken to search for the continuous wave interference tones with a finer resolution of +/−500 Hz is 320.01 seconds.

Figure 4:
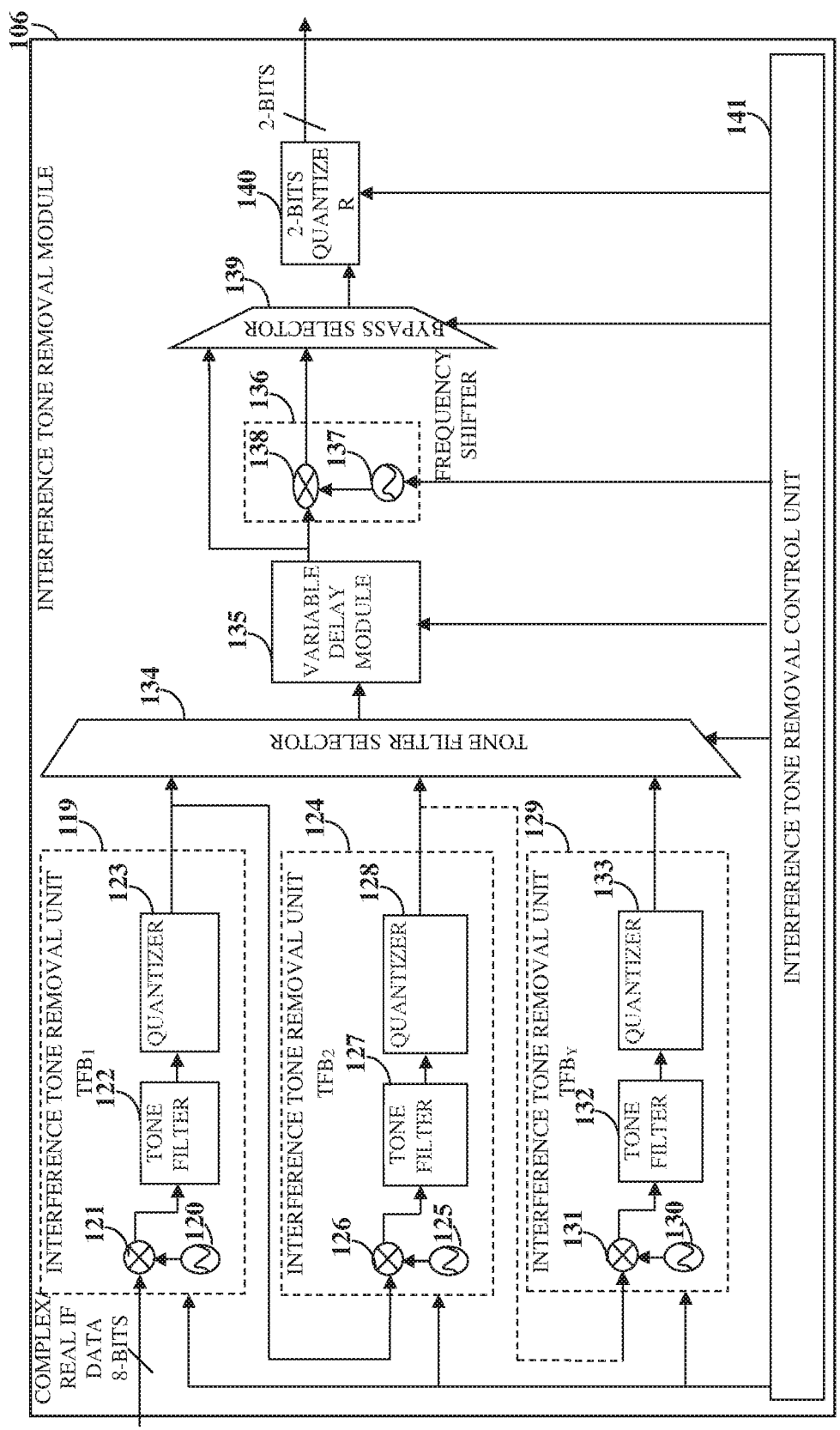
FIG. 4 exemplarily illustrates an interference tone removal module of the tones processing system for removing detected continuous wave interference tones with corresponding tone frequencies within a programmable signal frequency band from the N samples of the intermediate frequency data.

FIG. 4 exemplarily illustrates an interference tone removal module 106 of the tones processing system 103 for removing tracked continuous wave interference tones with corresponding tone frequencies within a programmable signal frequency band from the N samples of the intermediate frequency data. The interference tone removal module 106 comprises one or more interference tone removal units, for example, $TFB_1$ 119, $TFB_2$ 124, $TFB_3$, . . . $TFB_Y$ 129 corresponding to the tracked continuous wave interference tones, for example, Y continuous wave interference tone removal units cascaded to each other and an interference tone removal control unit 141. The interference tone removal control unit 141 enables or bypasses each of the interference tone removal units 119, 124, ..., 129 based on the number of continuous wave interference tones tracked by the interference tone tracker 105. Each of the interference tone removal units TFB$_2$ 124, TFB$_3$, ..., TFB$_Y$ 129, apart from the interference tone removal unit TFB$_1$ 119, receives P bits of a quantized tone suppressed output signal from preceding interference tone removal units TFB$_1$ 119, TFB$_2$ 124, TFB$_3$, ..., TFB$_Y$ 129. The interference tone removal unit TFB$_1$ 119 receives P=8 bits in the N samples of the intermediate frequency data from the radio frequency (RF) chip 101. Consider an example where the interference tone tracker 105 tracks 3 detected continuous wave interference tones with corresponding tone frequencies. The interference tone removal control unit 141 enables only 3 interference tone removal units, TFB$_1$ 119, TFB$_2$ 124, and TFB$_3$ and disables the remaining interference tone removal units TFB$_4$, TFB$_5$, ... TFB$_Y$ 129. A quantized tone suppressed output signal from TFB$_1$ 119 is the input to TFB$_2$ 124, the quantized tone suppressed output signal from TFB$_2$ 124 is the input to TFB$_3$, and the interference tone removal control unit 141 selects the quantized tone suppressed output signal from TFB$_3$ as output for further processing in the GNSS baseband processor 109 of the GNSS receiver 102. Each of the tracked continuous wave interference tones is suppressed in an interference tone removal unit of the interference tone removal module 106 respectively. The GNSS baseband processor 109, using a value of frequency shift in the selected quantized tone suppressed output signal that is transmitted by the interference tone removal module 106, translates the frequency of the selected quantized tone suppressed output signal to a baseband frequency.

Each of the interference tone removal units 119, 124, ..., 129 comprises a second signal generator 120, 125, ..., 130, a second mixer 121, 126, ..., 131 operably connected to the second signal generator 120, 125, ..., 130, a tone filter 122, 127, ..., 132 operably connected to the second mixer 121, 126, ..., 131, and a quantizer 123, 128, ..., 133 operably connected to the tone filter 122, 127, ..., 132. The second signal generator 120 generates a second local carrier signal with a computed initial phase corresponding to each of the tracked continuous wave interference tones with corresponding tone frequencies. The second local carrier signal comprises a resultant tone cancelling frequency that is determined from corresponding tone frequencies of the tracked continuous wave interference tones or a corresponding tone cancelling frequency of a second local carrier signal generated by a preceding interference tone removal unit. As used herein, "computed initial phase" refers to a phase that is added to the second local carrier signal for compensating for the phase rotation of the received global navigation satellite system (GNSS) signal resulting from detection of the continuous wave interference tones in the N samples of the intermediate frequency data of the received GNSS signal at different time instants which results in the second signal generator 125, ..., 130 generating the second local carrier signal at different time instants for the removal of the continuous wave interferences in the interference tone removal module 106. The computed initial phase is based on tone frequency of each of the continuous wave interference tones. As used herein, "resultant tone cancelling frequency" refers to a frequency of the second local carrier signal of each of the interference tone removal units 119, 124, ..., 129 to suppress each of the tracked continuous wave interference tones with a corresponding tone frequency in a separate interference tone removal unit. The interference tone removal control unit 141 in the interference tone removal module 106 determines the resultant tone cancelling frequency from the tone frequency of each of the tracked continuous wave interference tones and a tone cancelling frequency of the second local carrier signal of the preceding interference tone removal unit. The interference tone removal module 106 directly programs a phase increment word input to a phase accumulator 142 of the second signal generator 120 exemplarily illustrated in FIG. 6, to generate the second local carrier signal with the resultant tone cancelling frequency as disclosed in the detailed description of FIG. 6.

The interference tone removal unit TFB$_1$ 119 receives N samples of the complex digital IF data as input. The second signal generator 120 in TFB$_1$ 119 generates a second local carrier signal of the resultant tone cancelling frequency $-f_1$ configured by the interference tone removal control unit 141. The second signal generator 125 of the interference tone removal unit TFB$_2$ 124 generates a second local carrier signal of the resultant tone cancelling frequency $-(f_2-f_1)$. For the second local carrier signal of the TFB$_2$ 124, $f_2$ is the tone frequency of the tracked continuous wave interference tone and $f_1$ is the tone cancelling frequency of preceding interference tone removal unit TFB$_1$ 119. Similarly, the second signal generator 130 of the interference tone removal unit TFB$_Y$ 129 generates a second local carrier signal of the resultant tone cancelling frequency $-(f_Y-f_{Y-1})$. For the second local carrier signal of the TFB$_Y$ 129, $f_Y$ is the tone frequency of the tracked continuous wave interference tone and $f_{Y-1}$ is the tone cancelling frequency of preceding interference tone removal unit TFB$_{Y-1}$. Therefore, for TFB$_k$, the resultant tone cancelling frequency is $-(f_k-f_{k-1})$, where k=2 to Y. The resultant tone cancelling frequency of an interference tone removal unit is a difference of the tone frequency to be suppressed by the interference tone removal unit and the tone cancelling frequency of the preceding interference tone removal unit to counter a frequency shift in the output of the preceding interference tone removal unit, resulting in a phase rotation of the received global navigation satellite system (GNSS) signal as disclosed in the detailed description of FIG. 5.

The interference tone removal control unit 141 computes the initial phase as:

Computed initial phase $[k] = \mathrm{mod}((2\mathrm{pi}*f*\Delta t_{k1}), 2pl)$ where, f is the resultant tone cancelling frequency that is to be generated by the second signal generator and k varies from 1 to Y. $\Delta t_{k1}$ is the difference in time instant of starting of the second signal generator 120, 125, ... 130 of each of the interference tone removal units 119, 124, ..., 129 relative to the time instant of starting of the first interference tone removal unit 119. That is, if the second signal generator 120 of the first interference tone removal unit 119 starts at time $t_1$, the second signal generator 125, ..., 130 of the subsequent interference tone removal units 124, ..., 129 starts at time $t_2, t_3 ..., t_Y$. Then, $\Delta t_{11}$ is computed as $t_1-t_1$, $\Delta t_{21}$ is computed as $t_2-t_1$ ... $\Delta t_{N1}$ is computed as $t_N-t_1$. Using the difference in time instants, the interference tone removal control unit 141 computes the initial phase as disclosed in the detailed description of FIG. 5.

In an embodiment, to compensate for the phase rotation of the received global navigation satellite system (GNSS) signal, the interference tone tracker 105 estimates the tone phases of the tracked continuous wave interference tones and transmits the estimated tone phases to GNSS baseband tracking channels of the GNSS baseband tracking unit 109*b* of the GNSS baseband processor 109 for correction. With awareness of the phase of the received GNSS signal being tracked and the tone phases of the tracked continuous wave interference tones, the GNSS baseband tracking channels of the GNSS baseband tracking unit 109b computes the phase rotation of the received GNSS signal caused by the removal of the continuous wave interference tones by the interference tone removal module 106. The GNSS baseband tracking channels compute the phase rotation as the difference between the phase of the received GNSS signal and the tone phases of the tracked continuous wave interference tones. Therefore, the GNSS baseband tracking channels of the GNSS baseband tracking unit 109b can expect the possible phase rotation and compensate for the phase rotation in the phase estimation of the GNSS signal.

The second mixer 121 mixes the generated second local carrier signal N samples of the intermediate frequency data or the output of the preceding interference tone removal unit and generates a tone frequency shifted digital signal comprising tone filter shifted frequency components corresponding to the N samples of the intermediate frequency data. In the interference tone removal unit $TFB_1$ 119, the second mixer 121 mixes the N samples of the intermediate frequency data with the second local carrier signal of $-f_1$ as a resultant tone cancelling frequency and generates a tone frequency shifted digital signal. In the interference tone removal unit $TFB_2$ 124, the second mixer 121 mixes the output of the interference tone removal unit $TFB_1$ 119 with the second local carrier signal of the resultant tone canceling frequency $-(f_2-f_1)$ and generates a tone frequency shifted digital signal. The generated tone frequency shifted digital signal comprises tone filter shifted frequency components corresponding to the N samples of the intermediate frequency data. The tone filter shifted frequency components are shifted by the tone frequency of the detected continuous wave interference tone that is being removed by the interference tone removal unit. The tone frequency shifted digital signal comprises the tone filter shifted frequency components at a predetermined tone filter suppression frequency. The predetermined tone filter suppression frequency is 0 hertz or a frequency close to 0 hertz. The output of the second mixer 121 is at 0 hertz or a frequency close to 0 hertz by mixing the input of the second mixer 121 with the second local carrier signal of the resultant tone cancelling frequency. In the interference tone removal unit $TFB_1$ 119, the frequency components of the N samples of the intermediate frequency data are shifted by $f_1$. The continuous wave interference tone with the tone frequency $f_1$ is a frequency component of the N samples of the intermediate frequency data shifted to 0 Hz in the tone frequency shifted digital signal. In the interference tone removal unit $TFB_2$ 124, the frequency components of the output of $TFB_1$ 119, that is, the frequency components of a quantized tone suppressed output signal are shifted by $f_2$. The continuous wave interference tone with the tone frequency $f_2$ is a frequency component in the quantized tone suppressed output signal that is also shifted by $-f_2$ to 0 Hz in the tone frequency shifted digital signal.

Figure 7:
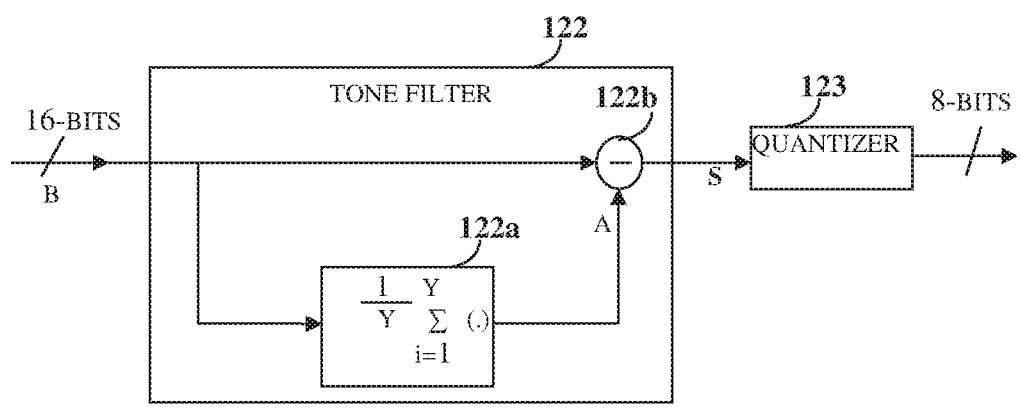
FIG. 7 exemplarily illustrates a block diagram of a tone filter of each of the interference tone removal units in the interference tone removal module of the tones processing system.

The tone filter 122, comprising a second amplitude estimator 122a and a subtractor 122b as exemplarily illustrated in FIG. 7, suppresses the generated tone filter shifted frequency components corresponding to the N samples of the intermediate frequency data, with frequencies corresponding to the predetermined tone filter suppression frequency to generate a tone suppressed output signal. The tone suppressed output signal comprises the suppressed tone filter shifted frequency components, free of the tracked continuous wave interference tones. The tone filter 122 is a direct current (DC) remover. The tone filter 122 suppresses the generated tone filter shifted frequency components at 0 Hz or closer to 0 Hz and outputs a tone suppressed output signal using the second amplitude estimator 122a and the subtractor 122b as disclosed in the detailed description of FIG. 7. In the interference tone removal unit $TFB_1$ 119, the tone filter 122 suppresses the tone filter shifted frequency components in the tone frequency shifted digital signal, that is, the continuous wave interference tone with tone frequency $f_1$, at 0 Hz. Similarly, in the interference tone removal unit $TFB_2$ 124, the tone filter 127 suppresses the tone filter shifted frequency components in the tone frequency shifted digital signal, that is, the continuous wave interference tone with tone frequency $f_2$, at 0 Hz.

Figure 8:
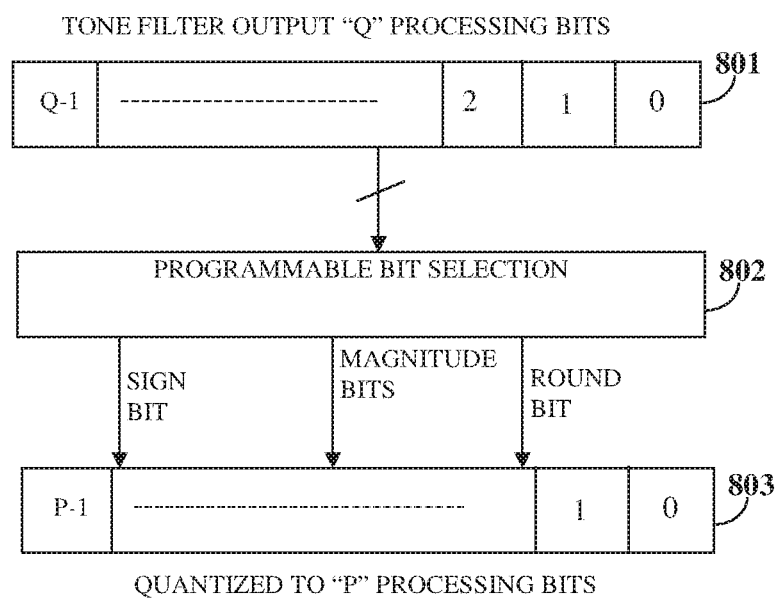
FIG. 8 exemplarily illustrates a schematic diagram of a local quantizer of each of the interference tone removal units in the interference tone removal module of the tones processing system.

The quantizer 123, 128, . . . , 133 in each of the interference tone removal units 119, 124, . . . , 129 quantizes the generated tone suppressed output signal free of the tracked continuous wave interference tones as disclosed in the detailed description of FIG. 8. The quantizer 123, 128, . . . , 133 reduces the number of processing bits in the generated tone suppressed output signal to P bits resulting in an equal logic area of each of the interference tone removal units 119, 124, . . . , 129 in the interference tone removal module 106. On reducing the number of processing bits, the logic area and power consumption of the GNSS receiver 102 are substantially reduced.

The interference tone removal module 106 further comprises a tone filter selector 134 operably connected to the interference tone removal units 119, 124, . . . , 129 and a variable delay module 135 operably connected to the tone filter selector 134. The tone filter selector 134 selects the quantized tone suppressed output signal from one of the interference tone removal units 119, 124, . . . , 129. The interference tone removal control unit 141 controls the tone filter selector 134 to select the quantized tone suppressed output signal from each of the interference tone removal units 119, 124, . . . , 129 and transmits the selected quantized tone suppressed output signal to the variable delay module 135.

The interference tone removal units 119, 124, . . . , 129 take the same number of clock cycles to generate the quantized output. Consider an example where the number of the clock cycles taken by the interference tone removal unit 119 from the input to the quantized output is C. Y is the number of interference tone removal units available in the interference tone removal module 106 to suppress maximum number of continuous wave interference tones; N is the number of interference tone removal units enabled in the interference tone removal module for the number of tracked continuous wave interference tones to be suppressed. The total number of clock cycles from the input of the interference tone removal module 106 to the interference tone removal unit $TFB_1$ 119 to the quantized output of the interference tone removal unit $TFB_Y$ 129 is Y*C. The latency L in the clock cycles to be introduced by the variable delay module 135 from the input of the interference tone removal unit 119 to output is given as follows:

$$L=Y*C-N*C$$

The variable delay module 135 maintains the latency in clock cycles from the input of the interference tone removal module 106 to the output of the variable delay module 135 as constant (Y*C). The variable delay module 135 maintains latency in clock cycles of the selected quantized tone suppressed output signal received from one of the interference tone removal units 119, 124, . . . , 129 as a constant value. The variable delay module 135 maintains the latency in clock cycles constant to ensure that the GNSS signal processed in the GNSS baseband processor 109 is synchronized in time irrespective of the number of continuous wave interference tones to be suppressed by the interference tone removal module 106. The variable delay module 135 delays the selected quantized tone suppressed output signal output from the tone filter selector 134 in time domain.

In an embodiment, the interference tone removal module 106 further comprises a frequency shifter 136 operably connected to the variable delay module 135 for shifting the frequency of the selected quantized tone suppressed output signal output from the variable delay module 135 to an intermediate frequency of the N samples of the intermediate frequency data received by the interference tone determination module 104 based on the tone frequencies of the detected continuous wave interference tones that are tracked prior to the removal of the detected continuous wave interference tones from the N samples of the intermediate frequency data. The information related to continuous wave interference tones provided by the interference tone tracker 105 or the GNSS baseband tracking channels of the GNSS baseband tracking unit 109b of the GNSS baseband processor 109 is used by the GNSS baseband processor 109 to determine the frequency shift to be introduced by the frequency shifter 136 to the output of the variable delay module 135. The frequency shifter 136 comprises a complex mixer 138 and a local signal generator 137. The local signal generator 137 generates a third local carrier signal and the complex mixer 138 mixes the selected quantized tone suppressed output signal output from the variable delay module 135 with the third local carrier signal. The output of the complex mixer 138 is a frequency compensated tone suppressed signal whose frequency is the intermediate frequency similar to the frequency of the received global navigation satellite system (GNSS) signal. The complex mixer 138 shifts frequency of the selected quantized tone suppressed output signal output by the variable delay module 135 to the intermediate frequency. The frequency shifter 136 compensates for the frequency shift that occurs in the process of removal of the continuous wave interference tones from the N samples of the intermediate frequency data using the interference tone removal module 106. In this embodiment, the interference tone removal module 106 further comprises a bypass selector 139 that bypasses the frequency shifter 136 and transmits the selected quantized tone suppressed output signal output from the variable delay module 135 to the GNSS baseband processor 109 of the global navigation satellite system receiver 102 for generating location data.

On bypassing the frequency shifter 136 using the bypass selector 139, a down converter in the GNSS baseband processor 109 compensates for the frequency shift in the selected quantized tone suppressed output signal output from the variable delay module 135 resulted in the process of removal of the continuous wave interference tones from the N samples of the intermediate frequency data using the interference tone removal module 106. In an embodiment, a signal frequency band in which the shifted frequency of the selected quantized tone suppressed output signal corresponding to the N samples of the intermediate frequency data output from the frequency shifter 136 lies is equal to the signal frequency band of the N samples of the intermediate frequency data. In an embodiment, the signal frequency band in which the shifted frequency of the selected quantized tone suppressed output signal corresponding to the N samples of the intermediate frequency data output from the frequency shifter 136 is not equal to the signal frequency band of the N samples of the intermediate frequency data. In an embodiment, the variable delay module 135 performs time shifting of the selected quantized tone suppressed output signal output from the tone filter selector 134 to an intermediate frequency of the N samples of the intermediate frequency data of the received global navigation satellite system (GNSS) signal. The interference tone removal module further comprises a 2 bits quantizer 140 for converting the P bits of tone free intermediate frequency data from the bypass selector 139 to 2 bits for the GNSS baseband processor 109. The 2-bits quantizer 140 is controlled by the interference tone removal control unit 141. The 2-bits quantizer 140 comprises a programmable bit selection control to select the sign and magnitude bits of the tone free intermediate frequency data. In an embodiment, the 2-bits quantizer 140 can also have programmable upper, lower and mean threshold mechanism for quantizing the tone free intermediate frequency data to 2-bits.

The interference tone removal control unit 141 in the interference tone removal module 106 is operably connected to the interference tone removal units 119, 124, ..., 129, the tone filter selector 134, the variable delay module 135, the frequency shifter 136, the bypass selector 139, and the 2-bits quantizer 140. The interference tone removal control unit 141 deactivates one or more interference tone removal units 119, 124, ..., 129 based on the number of the tracked continuous wave interference tones and furthermore, determines and configures the resultant tone cancelling frequency of the second local carrier signal in the second signal generator 120, 125, ..., 130 of each of the interference tone removal units 119, 124, ..., 129. The interference tone removal control unit 141 selects processing bits in the generated tone suppressed output signal for bit truncation and rounding in the quantizer 123, 128, ..., 133 of each of the interference tone removal units 119, 124, ..., 129. The interference tone removal control unit 141 configures the tone filter selector 134 to select the quantized tone suppressed output signal free of the tracked continuous wave interference tones received from one of the interference tone removal units 119, 124, ..., 129. The interference tone removal control unit 141 configures the variable delay module 135 to maintain a constant delay from the input of the interference tone removal module 106 to the output of the variable delay module 135 irrespective of the number of the interference tone removal units enabled, that is, the number of continuous wave interference tones to be suppressed. The interference tone removal control unit 141 configures the frequency of the third local carrier signal generated by a signal generator of the frequency shifter 136 to shift the frequency of the selected quantized tone suppressed output signal output from the variable delay module 135 to an intermediate frequency of the N samples of the intermediate frequency data received by the interference tone determination module 104 based on the tone frequencies of the tracked continuous wave interference tones. The interference tone removal control unit 141 configures the bypass selector 139 to bypass the frequency shifter 136 and transmit the selected quantized tone suppressed output signal output from the variable delay module 135 to the GNSS baseband processor 109.

If the number of continuous wave interference tones to be detected by the interference tone determination module 104 is substantially large, the output of the interference tone removal module 106 is looped back into the interference tone determination module 104 to search for additional continuous wave interference tones in the interference tone removal module 106 output. On looping the output of the interference tone removal module 106, the GNSS receiver 102 validates performance of the interference tone removal module 106 by detecting the residual power of the continuous wave interference tones that were removed. During the loop back input for the detection of the continuous wave interference tones in the interference tone removal module 106, the N samples of the intermediate frequency data are taken from the interference tone removal module 106 output.

Figure 5:
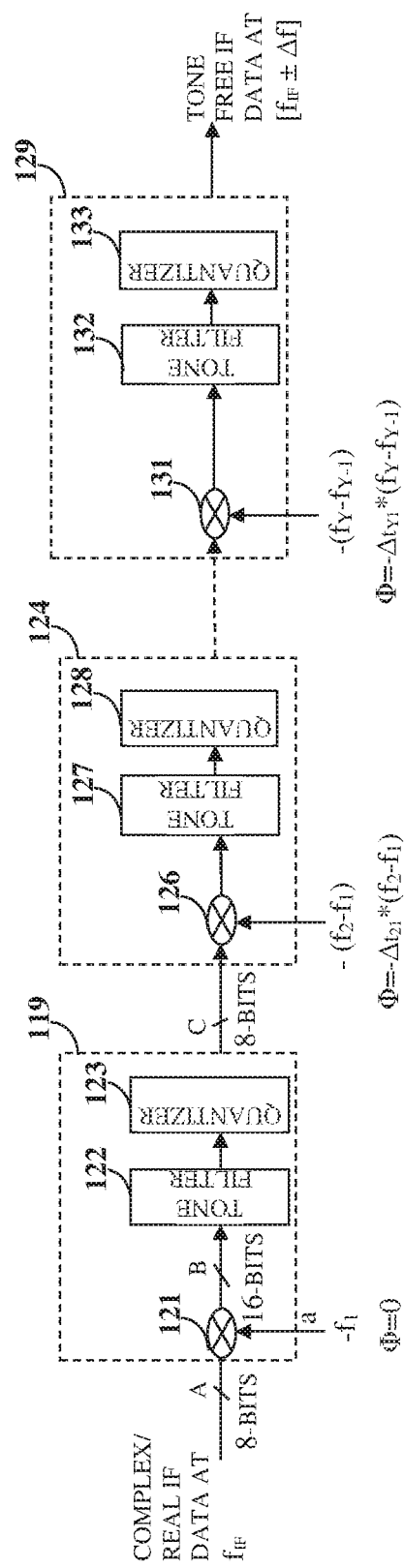
FIG. 5 exemplarily illustrates a schematic diagram of the interference tone removal module of the tones processing system showing interference tone removal units cascaded together for removing detected continuous wave interference tones with corresponding tone frequencies within a programmable signal frequency band from the N samples of the intermediate frequency data.

FIG. 5 exemplarily illustrates a schematic diagram of the interference tone removal module 106 of the tones processing system 103 showing interference tone removal units 119, 124, . . . , 129 cascaded together for removing tracked continuous wave interference tones with corresponding tone frequencies within a programmable signal frequency band (PFB$_1$) from the N samples of the intermediate frequency data. As disclosed in the detailed description of the FIG. 4, the interference tone removal module 106 comprises the interference tone removal units TFB$_1$ 119, TFB$_2$ 124, . . . , TFB$_Y$ 129 cascaded together. The input to the interference tone removal unit TFB$_1$ 119 as exemplarily illustrated in the FIG. 5 is the N samples of the intermediate frequency data of the received global navigation satellite system (GNSS) signal transmitted by the radio frequency (RF) chip 101 and is represented by A:

$$A = \text{Code}(t).\text{Data}(t)e^{j2\pi(f_{IF}+f_{dop})t} K_1 e^{\pm j2\pi f_1 t} + K_2 e^{\pm j2\pi f_2 t} + K_3 e^{\pm 2\pi f_3 t} + \ldots + \text{Gaussian noise}$$

where, $\text{Code}(t).\text{Data}(t)e^{j2\pi(f_{IF}+f_{dop})t}$ represents samples of the intermediate frequency data that comprise actual location data, $K_1 e^{\pm j2\pi f_1 t}$ represents a frequency component of the received global navigation satellite system (GNSS) signal representing a continuous wave interference tone with a tone frequency $\pm f_1$ and an amplitude of $K_1$, $K_2 e^{\pm j2\pi f_2 t}$ represents a frequency component of the received GNSS signal representing a continuous wave interference tone with a tone frequency $\pm f_2$ and an amplitude of $K_2$, $K_3 e^{\pm 2\pi f_3 t}$ represents a frequency component of the received GNSS signal representing a detected continuous wave interference tone with a tone frequency $\pm f_3$ and an amplitude of $K_3$. The number of processing bits in the N samples of the intermediate frequency data is 5.

The tracked continuous wave interference tones with corresponding tone frequencies, $\pm f_1, \pm f_2, \ldots, \pm f_Y$ are to be removed by interference tone removal units TFB$_1$ 119, TFB$_2$ 124, . . . , TFB$_Y$ 129 respectively. Consider an example where a local carrier oscillator of the second signal generator 120 starts at time $t_1$, a local carrier oscillator of the second signal generator 125 starts at time $t_2$, a local carrier oscillator of the second signal generator of the TFB$_3$ starts at time $t_3$ and a local carrier oscillator of the second signal generator 130 starts at time $t_Y$. The difference in time instants of the start of generation of the second local carrier signals in the second signal generators 120, 125, . . . , 130 is given as $\Delta T_{11} = t_1 - t_1$, $\Delta T_{21} = t_2 - t_1$ . . . $\Delta T_{Y1} = t_Y - t_1$, respectively. The second signal generator 120 of the interference tone removal unit TFB$_1$ 119 is programmed by the interference tone removal control unit 141 to generate a second local carrier signal of a resultant tone cancelling frequency equal to the tone frequency $-f_1$. The second local carrier signal is represented by a:

$$a = e^{-j(2\pi f_1 t + \Phi)}$$

where, $f_1$ is the tone frequency of the tracked continuous wave interference tone, $\Phi = -\Delta T_{11} * f_1$ is the computed initial phase of the second local carrier signal at the time of generation, and $\Delta T_{11}$ is the time elapsed from the start of the second local carrier generation with respect to itself in the interference tone removal unit TFB$_1$ 119. That is, $\Delta T_{11} = 0$ and $\Delta T_{Y1}$ is the time elapsed from the start of the second local carrier generation in the interference tone removal unit TFB$_Y$ 129 with respect to the start of the second local carrier generation in the interference tone removal unit TFB$_1$ 119.

The second mixer 121 of the interference tone removal unit TFB$_1$ 119 mixes the N samples of the intermediate frequency data of the received GNSS signal with the generated second local carrier signal to generate the intermediate frequency shifted digital signal comprising tone filter shifted frequency components corresponding to the N samples of the intermediate frequency data. The intermediate frequency shifted digital signal is represented by B as:

$$B = A * a$$

On mixing the N samples of the intermediate frequency data of 8 processing bits to the second local carrier signal of 8 processing bits, the intermediate frequency shifted digital signal B is 16 processing bits long. The intermediate frequency shifted digital signal is input to the tone filter 122 that suppresses the generated tone filter shifted frequency components with frequencies corresponding to the predetermined tone filter suppression frequency, that is, 0 Hz and generates a tone suppressed output signal that is free of the continuous wave interference tone of tone frequency $f_1$. The tone suppressed output signal still comprises the continuous wave interference tones with corresponding tone frequencies $f_2, f_3, \ldots, f_Y$. The number of processing bits in the tone suppressed output signal is also 16. The quantizer 123 quantizer the tone suppressed output signal and generates a quantized tone suppressed output signal. The quantizer 123 reduces the number of processing bits in the tone suppressed output signal to generate the quantized tone suppressed output signal represented by C in FIG. 5 with 8 processing bits. The quantized tone suppressed output signal of the interference tone removal unit TFB$_1$ 119 is fed as input to the interference tone removal unit TFB$_2$ 124 to remove the continuous wave interference tone with tone frequency $f_2$.

The interference tone removal control unit 141 determines a resultant tone cancelling frequency of the second local carrier signal to be generated by the second signal generator 125 of the interference tone removal unit TFB$_2$ 124 as $-(f_2 - f_1)$ and the computed initial phase of the second local carrier signal of the interference tone removal unit TFB$_2$ 124 as $\Phi = -\Delta T_{21} * (f_2 - f_1)$. The second mixer 126 mixes the quantized tone suppressed output signal of the interference tone removal unit TFB$_1$ 119 with the second local carrier signal of the interference tone removal unit TFB$_2$ 124 to generate an intermediate frequency shifted digital signal that is passed to the tone filter 127 and the quantizer 128 to generate a quantized tone suppressed output signal of the interference tone removal unit TFB$_2$ 124.

Similarly, the quantized tone suppressed output signal of the interference tone removal unit TFB$_{Y-1}$ is fed as input to the interference tone removal unit TFB$_Y$ 129 to remove the continuous wave interference tone with tone frequency $f_Y$. The interference tone removal control unit 141 determines a resultant tone cancelling frequency of the second local carrier signal to be generated by the second signal generator 130 of the interference tone removal unit TFB$_Y$ 129 as $-(f_Y - f_{Y-1})$ and the computed initial phase of the second local carrier signal of the interference tone removal unit TFB$_Y$ 129 as $101 = \Delta T_Y * (f_Y - f_{Y-1})$. The second mixer 131 mixes the quantized tone suppressed output signal of the interference tone removal unit TFB$_{Y-1}$ with the second local carrier signal of the interference tone removal unit $TFB_Y$ 129 to generate an intermediate frequency shifted digital signal that is passed to the tone filter 132 and the quantizer 133 to generate a quantized tone suppressed output signal of the interference tone removal unit $TFB_Y$ 129. The quantized tone suppressed output signal of the interference tone removal unit $TFB_Y$ 129 is free of the tone frequencies $f_1$, $f_2$, $f_3$, ..., $f_Y$ with a frequency $f_{IF}$ and a frequency shift $\Delta f$.

Consider an example of the N samples of the intermediate frequency data received by the radio frequency (RF) chip 101 of the global navigation satellite system (GNSS) receiver 102 comprising two continuous wave interference tones with corresponding tone frequencies $f_1$ and $f_2$. The N samples of the intermediate frequency data are represented as: $A = Code(t).Data(t).A_g \ e^{j(2\pi f_g t + \Phi g)} + A_1 \ e^{j(2\pi f_1 t + \Phi_1)} + A_2 e^{j(2\pi f_2 t + \Phi_2)} + n(t)$ where $A_g$ is amplitude of the samples of the intermediate frequency data that comprise actual location data, $f_g$ is intermediate frequency of the global navigation satellite system (GNSS) signal, $A_1$ and $A_2$ are amplitudes of two continuous wave interference tones with corresponding tone frequencies $f_1$ and $f_2$, and $\Phi_g$, $\Phi_1$, and $\Phi_2$ are phase of the samples of the intermediate frequency data that comprise actual location data and the tone phases of the two continuous wave interference tones relative to phase of the second local carrier signal generated by the second signal generator 120 of an interference tone removal unit TFB1119 generating $-f_1t$ to suppress continuous wave interference tone at $+f_1$. The N samples of the intermediate frequency data represented by A is mixed in the second mixer 121 of the interference tone removal unit $TFB_1$ 119 with the second local carrier signal of resultant tone cancelling frequency $-f_1$ and generates a tone frequency shifted digital signal represented as:

$B = Code(t).Data(t).A_g e^{j(2\pi(f_g - f_1)t + \Phi g)} + A_1 e^{j(2\pi(f_1 - f_1)t + \Phi_1)} + A_2 e^{j(2\pi(f_2 - f_1)t + \Phi_2)} + n(t)e^{-j2\pi f_1 t}$ $B = Code(t).Data(t).A_g e^{j(2\pi(f_g - f_1)t + \Phi g)} + A_1 e^{j\Phi_1} + A_2 e^{j(2\pi(f_2 - f_1)t + \Phi_2)} + n(at)e^{-j2\pi f_1 t}$ The second amplitude estimator 122a of the tone filter 122 estimates amplitude $A_1$ of the continuous wave interference tone with corresponding tone frequency $f_1$ as disclosed in the detailed description of FIG. 7 and the subtractor 122b subtracts the estimated amplitude from the each of the frequency components of the tone frequency shifted digital signal. The frequency component with amplitude $A_1$ representing the continuous wave interference tone with corresponding tone frequency $f_1$ is suppressed. Thus, the tone suppressed output signal C is free of the continuous wave interference tone with tone frequency $f_1$ and is represented as:

$C = Code(t).Data(t).A_g \ e^{j(2\pi(f_g - f_1)t + \Phi g)} + A_2 \ e^{j(2\pi(f_2 - f_1)t + \Phi_2)} + n(t)e^{-j2\pi f_1 t}$ The tone suppressed output signal C is transmitted to the interference tone removal unit $TFB_2$ 124. Consider the second signal generator 125 of the interference tone removal unit $TFB_2$ 124 starts at a time instant $t_2$, that is, $t - t_2 = \Delta t$ $t_2 = t - \Delta t$ The second signal generator 125 of the interference tone removal unit $TFB_2$ 124 generates a second local carrier signal of a frequency $-(f_2 - f_1)$. The second mixer 126 of the interference tone removal unit $TFB_2$ 124 mixes $-(f_2 - f_1)t_2$ and the tone suppressed output signal C of the interference tone removal unit $TFB_1$ 119 and generates a tone frequency shifted digital signal represented as:

$D = Code(t).Data(t).A_g e^{j(2\pi(f_g - f_1)t - 2\pi(f_2 - f_1)t_2 + \Phi_2 + \Phi g)} + A_2 e^{j(2\pi(f_2 - f_1)t - 2\pi(f_2 - f_1)t_2 + \Phi_2)} + n(t)e^{-j(2\pi f_1 t - 2\pi(f_2 - f_1)t_2 + 0)}$ On replacing $t_2 = t - \Delta t$ in the above expression, the tone frequency shifted digital signal is represented as:

$D = Code(t).Data(t).A_g e^{j(2\pi(f_g - f_1)t + \Phi g + 2\pi(f_2 - f_1)\Delta t)} + A_2 e^{j(\Phi_2 + 2\pi(f_2 - f_1)\Delta t)} + n(t)e^{-j2\pi f_2 t - 2\pi(f_2 - f_1)\Delta t}$ The tone frequency shifted digital signal D above indicates an additional phase of $+2\pi(f_2 - f_1)\Delta t$ that is added to the samples of the intermediate frequency data that comprise actual location data. That is, there is a phase rotation that is introduced. The phase rotation is compensated by the tones processing system 103 of the global navigation satellite system (GNSS) receiver 102. The interference tone removal control unit 141 configures the second local carrier signal of the interference tone removal unit $TFB_1$ 119 to start with an initial computed phase of $2\pi(f_2 - f_1)\Delta t$. With the initial computed phase of $2\pi(f_2 - f_1)\Delta t$, the second signal generator 125 of the interference tone removal unit $TFB_2$ 124 generates a second local carrier signal E as:

$E = e^{-j(2\pi(f_2 - f_1)(t - \Delta t) + 2\pi(f_2 - f_1)\Delta t)}$ $E = e^{-j(2\pi(f_2 - f_1)t)}$ On mixing the second local carrier signal E with the tone suppressed output signal C of the interference tone removal unit $TFB_1$ 119, the tone frequency shifted digital signal generated by the second mixer 126 of the interference tone removal unit $TFB_2$ 124 is represented as:

$D = Code(t).Data(t).A_g e^{j(2\pi(f_g - f_2)t + \Phi g)} + A_2 e^{j\Phi_2} + n(t)e^{-j2\pi f_1 t}$ As shown above, there is no phase rotation introduced due to the mixing of the second local carrier signal E in the second mixer 126 of the interference tone removal unit $TFB_2$ 124. The phase of the samples of the intermediate frequency data that comprise actual location data has been retained relative to second signal generator 120 of the interference tone removal unit $TFB_1$ 119.

Figure 6:
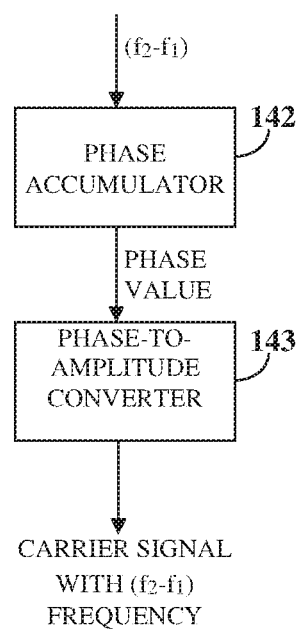
FIG. 6 exemplarily illustrates a block diagram of a second signal generator of an interference tone removal unit for generating a second local carrier signal with a resultant tone cancelling frequency.

Each of the second signal generators 120, 125, ..., 130 and the local signal generator 137 of the frequency shifter 136 comprises a phase accumulator 142 and a phase-to-amplitude converter 143 exemplarily illustrated in FIG. 6, to generate a second local carrier signal and a third local carrier signal respectively with a predetermined phase. The interference tone removal control unit 141 computes an initial phase and initializes the phase accumulator of each of the second signal generators 120, 125, ..., 130 and the local signal generator 137 with the computed initial phase to ensure the phase of the N samples of the intermediate frequency data is maintained. The interference tone removal control unit 141 changes the phase of the phase accumulator dynamically if any correction in the phase of the N samples is required. When the second signal generators 120, 125, ..., 130 generate the second local carrier signals at different time instants to remove the continuous wave interference tones, the phase rotation in the N samples of the intermediate frequency data is introduced. For suppressing a first continuous wave interference tone, the second signal generator 120 of the interference tone removal unit $TFB_1$ 119 and the local signal generator 137 of the frequency shifter 136 start at the same time instant. For the second signal generator 125, ..., 130 of the interference tone removal units $TFB_2$ 124, $TFB_3$, ..., $TFB_Y$ 129, to compensate for the introduced phase rotation, the interference tone removal control unit 141 computes an initial phase at the time instant of generation of the second local carrier signal in the second signal generator 120 of the interference tone removal unit TFB$_1$ 119 relative to the time instant of generation of the second local carrier signal in each of the second signal generators 125, . . . , 130 of the interference tone removal units TFB$_2$ 124, TFB$_3$, TFB$_Y$ 129. The local signal generator 137 of the frequency shifter 136 is restarted with the computed initial phase and an updated frequency associated with the frequency shift in the selected quantized tone suppressed output signal to restore the frequency of the selected quantized tone suppressed output signal to the radio frequency (RF) signal band.

In an embodiment, the tones processing system 103 of the global navigation satellite system (GNSS) receiver 102 compensates for the phase rotation by generating the second local carrier signal of the second signal generator 125 of the interference tone removal unit TFB$_2$ 124 at the same time instant as the second local carrier signal of the second signal generator 120 of the interference tone removal unit TFB$_1$ 119. That is, the time difference Δt between time instants of second local carrier signal of the interference tone removal unit TFB$_2$ 124 and the second local carrier signal of the interference tone removal unit TFB$_1$ 119 is 0. In this embodiment, the detection of the continuous wave interference tones with corresponding tone frequencies f$_1$ and f$_2$ occurs simultaneously. In this embodiment, the computed initial phase of the second local carrier signal of the interference tone removal unit TFB$_2$ 124 is 0.

In an embodiment, the global navigation satellite system (GNSS) baseband processor 109 compensates for the phase rotation. The GNSS baseband tracking unit 109b executes a phase rotation compensation module deployed in the GNSS baseband processor 109 using the GNSS baseband tracking channels compensates for the phase rotation of the N samples of the intermediate frequency data based on a phase of the GNSS signal being tracked and the tone phase of each of the tracked continuous wave interference tones transmitted by the GNSS baseband processor 109 or the interference tone tracker 105.

FIG. 6 exemplarily illustrates a block diagram of a second signal generator 120 of an interference tone removal unit 119 for generating a second local carrier signal with a resultant tone cancelling frequency. The second signal generator 120 is a numerically controlled oscillator (NCO) that comprises a phase accumulator 142 operably connected to the interference tone removal control unit 141 and a phase-to-amplitude converter 143 operably connected to the phase accumulator 142. The phase accumulator 142 receives a phase increment word determined by the interference tone removal control unit 141. The phase increment word defines the frequency of the second local carrier signal generated by the second signal generator 120. As exemplarily illustrated, the phase accumulator 142 receives an input of a phase increment word from the interference tone removal control unit 141 to generate a phase value corresponding to a second local carrier signal of frequency f$_2$-f$_1$. The phase value output by the phase accumulator 142 indexes a waveform table in a memory unit of the second signal generator 120. The waveform table comprises the quantized amplitudes of a sine wave. The phase to amplitude converter 143 generates the sine waveform of a frequency f$_2$-f$_1$ whose amplitude is determined by the phase-to-amplitude converter 143. The phase-to-amplitude converter 143 determines the amplitude of the second local carrier signal to be generated by the second signal generator 120 corresponding to the phase value output by the phase accumulator 142.

FIG. 7 exemplarily illustrates a block diagram of a tone filter 122, 127, . . . , 132 and a quantizer 123, 128, . . . , 133 of each of the interference tone removal units 119, 124, . . . , 129 in the interference tone removal module 106 of the tones processing system 103. The tone filter 122 comprises a second amplitude estimator 122a and a subtractor 122b as exemplarily illustrated in FIG. 7. The second amplitude estimator 122a of the tone filter 122 receives tone filter shifted frequency components corresponding to the N samples of the intermediate frequency data from the second mixer 121. The second amplitude estimator 122a computes a mean value of amplitudes of the tone filter shifted frequency components of the tone frequency shifted digital signal generated by the second mixer 121 corresponding to the N samples of the intermediate frequency data over a predetermined amplitude estimation period.

The second amplitude estimator 122a, for example, an integrate and dump unit that computes the mean value of amplitudes of the tone filter shifted frequency components for an integration period, that is, the predetermined amplitude estimation period. The predetermined amplitude estimation period depends on an amplitude estimation filter bandwidth (B$_{est}$). The predetermined amplitude estimation period (T$_{est}$)1/(B$_{est}$). The interference tone removal control unit 141 configures the predetermined amplitude estimation period (T$_{est}$) based on the amplitude estimation filter bandwidth (B$_{est}$) optimal for suppression of the tone filter shifted frequency components with frequencies corresponding to the predetermined tone filter suppression frequency.

The computed mean value of amplitudes of the tone filter shifted frequency components is equal to the sum of the amplitudes of the tone filter shifted frequency components integrated over the predetermined amplitude estimation period/total number of the tone filter shifted frequency components whose amplitudes are integrated. The total number of the tone filter shifted frequency components Y whose amplitudes are integrated over the predetermined amplitude estimation period T$_{est}$ is given as Y=B$_{est}$*T, where T is a time interval between the amplitudes of the tone filter shifted frequency components and is equal to 1/sampling frequency. That is, if there are N samples at the output of the mixer 121 exemplarily illustrated in FIG. 5, and if only Y samples are integrated by the second amplitude estimator 122a, then the computed mean value of amplitudes of the tone filter shifted frequency components is given as (1/Y) *sum(B, 1 to Y samples) in time domain, where B is the amplitudes of the tone filter shifted frequency components with frequencies equal to the predetermined tone filter suppression frequency, that is, 0 hertz (Hz) or near 0 Hz. The second amplitude estimator 122a performs integration, dumping, and average operations on the tone filter shifted frequency components over the predetermined amplitude estimation period T$_{est}$. In an embodiment, the interference tone removal control unit 141 configures an amplitude estimation rate T$_{est\_rate}$ in the second amplitude estimator 122a. As used herein, "amplitude estimation rate T$_{est\_rate}$" refers to a rate of integration of amplitudes of the tone filter shifted frequency components in the second amplitude estimator 122a. In an embodiment, the tone amplitude estimation rate T$_{est\_rate}$ is a continuous rate for computing a mean value of the amplitudes of the tone filter shifted frequency components. In an embodiment, the tone amplitude estimation rate T$_{est\_rate}$ is a periodic rate. The predetermined amplitude estimation period T$_{est}$ and the amplitude estimation rate T$_{est\_rate}$ are equal. In an embodiment, the predetermined amplitude estimation period $T_{est}$ and the amplitude estimation rate $T_{est\_rate}$ are different. Consider, the value of predetermined amplitude estimation period $T_{est}$ is 1 millisecond (ins) and the amplitude estimation rate $T_{est\_rate}$ is 500 ms. That is, the second amplitude estimator 122a estimates the amplitudes of the tone filter shifted frequency components for 1 ms and the subtractor 122b subtracts the estimated amplitudes of the tone filter frequency components from each of the tone filter shifted frequency components output from the second mixer 121 for 500 ms. Similarly, the second amplitude estimator 122a estimates the successive amplitudes of the tone filter shifted frequency components in a window from 500 ms to 501 ms and the subtractor 122b subtracts the estimated successive amplitudes of the tone filter shifted frequency components from each of the tone filter shifted frequency components output from the second mixer 121 from 501 ms to 1000 ms.

The subtractor 122b of the tone filter 122 as exemplarily illustrated in FIG. 7 subtracts the computed mean value of the amplitudes of the tone filter shifted frequency components from each of the tone filter shifted frequency components of the generated tone frequency shifted digital signal with frequencies corresponding to the predetermined tone filter suppression frequency to generate a tone suppressed output signal. The tone frequency shifted digital signal comprises a predetermined number of tone filter shifted frequency components with frequencies corresponding to the predetermined tone filter suppression frequency. That is, the tone filter shifted frequency components with frequencies equal to the predetermined tone filter suppression frequency, that is, 0 hertz (Hz) or near 0 Hz have corresponding amplitudes B as exemplarily illustrated in FIG. 7. The computed mean value of the amplitudes of the tone filter shifted frequency components A as exemplarily illustrated in FIG. 7 estimates the amplitude of the tone filter shifted frequency components including the amplitude of the tone filter shifted frequency components that represent the continuous wave interference tones. That is, the computed mean value of the amplitudes of the tone filter shifted frequency components A estimates the amplitude of the tone filter shifted frequency components, which will be the same as the amplitude of continuous wave interference tones, that has been brought to tone filter suppression frequency (0 Hz) since integrate and dump will attenuate the frequency components other than 0 such that the other frequency components will not have a significant impact on the computed mean. The subtractor 122b subtracts A from B and generates a tone suppressed output signal given as S=B−A as exemplarily illustrated in FIG. 7. The generated tone suppressed signal is free of the tone filter shifted frequency components representing the continuous wave interference tones.

The estimated amplitude of the Y tone filter shifted frequency components will have a sample delay of Y tone filter shifted frequency components, where $Y=B_{est}*T$. Thus, the estimated amplitude of the Y tone filter shifted frequency components for the predetermined amplitude estimation period $T_{est}$ will suppress the tone filter shifted frequency components representing the continuous wave interference tones occurring in a successive predetermined amplitude estimation period $T_{est}$. In an embodiment, the tone filter 122, further comprising a plurality of delay registers, suppresses the tone filter shifted frequency components representing the continuous wave interference tones in the current predetermined amplitude estimation period $T_{est}$ using the estimated amplitude of the Y tone filter shifted frequency components for the current predetermined amplitude estimation period $T_{est}$.

Consider an example where a continuous wave interference tone with a tone frequency $f_1$ is to be suppressed by the tone filter 122 of an interference tone removal unit $TFB_1$ 119. The second mixer 121 generates a tone frequency shifted digital signal comprising tone filter shifted frequency components on mixing the N samples of the intermediate frequency data with a second local carrier signal of resultant tone cancelling frequency $-f_1$. The tone filter shifted frequency components have a frequency and corresponding amplitudes. The tone frequency shifted digital signal is shifted by the tone cancelling frequency $-f_1$. The tone frequency shifted digital signal will comprise tone filter shifted frequency components with frequencies equal to 0 Hz or near 0 Hz. The tone filter shifted frequency components at 0 Hz or near 0 Hz represent the continuous wave interference tones of tone frequency $f_1$. The second amplitude estimator 122a estimates amplitudes of the tone filter shifted frequency components with frequencies equal to 0 Hz or near 0 Hz by computing a mean of the amplitudes of the tone filter shifted frequency components. The subtractor 122b subtracts the computed mean of the amplitudes of the tone filter shifted frequency components from each of the tone filter shifted frequency components with frequencies corresponding to 0 Hz or near 0 Hz. On subtraction, the tone filter shifted frequency components with frequencies corresponding to 0 Hz or near 0 Hz are suppressed from the tone frequency shifted digital signal and a tone suppressed output signal is generated.

As exemplarily illustrated in FIG. 5, the quantizer 123 reduces the number of processing bits in the tone suppressed output signal generated by the tone filter 122 using bit truncation and rounding of an integer value of the generated tone suppressed output signal to a nearest quantized integer value. The quantizer 123 selects a first predetermined number of processing bits in the generated tone suppressed output signal for determining a sign of the integer value of the generated tone suppressed output signal. In an embodiment, the quantizer 123 selects a most significant bit (MSB) or a least significant bit (LSB) out of the processing bits in the generated tone suppressed output signal for determining a sign of the integer value of the generated tone suppressed output signal. Further, the quantizer 123 selects a second predetermined number of processing bits apart from the selected first predetermined number of the processing bits in the generated tone suppressed output signal for determining a magnitude of the integer value of the generated tone suppressed output signal. Furthermore, the quantizer 123 rounds the determined magnitude of the integer value of the generated tone suppressed output signal to the nearest quantized integer value using remaining processing bits in the generated tone suppressed output signal apart from the selected first predetermined number of processing bits and the selected second predetermined number of processing bits.

As exemplarily illustrated in FIG. 8, the tone suppressed output signals 801 of the tone filters 122, 127, . . . , 132 have Q processing bits. The quantizer 123, 128, . . . , 133 operably connected to the tone filter 122, 127, . . . , 132 of each of the interference tone removal units 119, 124, . . . , 129 reduces the Q processing bits to P processing bits equal to the number of processing bits in the N samples of the intermediate frequency data. In an embodiment, the quantizer 123, 128, . . . , 133 reduce the Q processing bits to P processing bits that are not equal to the number of processing bits in the N samples of the intermediate frequency data. The quantizer 123 quantizes the tone suppressed output signal without degrading noise floor of the N samples of the intermediate frequency data by a programmable bit selection method 802 using truncation and rounding. Out of the Q processing bits in the tone suppressed output signal, the quantizer 123 selects a processing bit from the MSB position, that is, the MSB bit to represent sign of the integer value of the tone suppressed output signal. Therefore, the quantizer 123 selects the MSB bit as a sign bit, assuming the integer value represented by the Q processing bits is a signed integer value. From the remaining Q−1 processing bits, the quantizer 123 selects C processing bits as magnitude bits that are used along with the sign bit to determine the magnitude of the integer value of the generated tone suppressed output signal. From the remaining Q−(C+1) processing bits, the quantizer 123 selects a predetermined number of processing bits as a rounding bit. The quantizer 123 rounds the determined magnitude of the integer value of the generated tone suppressed output signal to the nearest quantized integer value by adding the rounding bit to the magnitude bits and the sign bit. The quantizer generates quantized tone suppressed output signals 803 comprising P processing bits.

Consider an example where a tone suppressed output signal is a 6-bit integer, that is, the number of processing bits in the tone suppressed output signal is 6. The quantizer 123 reduces the number of processing bits in the tone suppressed output signal from 6 to 4. The quantizer 123 truncates the processing bit in the LSB position and selects the processing bit in bit position 2, next to the LSB position, as a rounding bit. The quantizer 123 selects the processing bit in the MSB position as a sign bit and the remaining processing bits in bit position 5, bit position 4, and bit position 3 as magnitude bits. If the tone suppressed output signal is −19, the interference tone removal control unit 141 represents the tone suppressed output signal in signed binary representation as 101101. The quantizer 123 selects the sign bit as 1 as the processing bit in MSB position and truncates the processing bit in the LSB position. The quantizer 123 selects the magnitude bits as 0, 1, and 1 from the bit position 5, bit position 4, and bit position 3. The quantizer 123 selects the rounding bit as 0 from the bit position 2. The magnitude of the integer value of the tone suppressed output signal is represented by the sign bit and the magnitude bits in the same order as 1011. The quantizer 123 adds the processing bits representing the magnitude of the integer value of the tone suppressed output signal to the rounding bit to obtain a signed binary representation of a quantized nearest integer value as 1011+0=1011 representing −5. On dividing the tone suppressed output signal −19 by 4 to reduce the number of processing bits to 4, the integer value obtained is −19/4=−4.75. The quantizer 123 successfully rounds the obtained integer to the nearest integer value −5 by using bit truncation and rounding as disclosed above.

Similarly, if the tone suppressed output signal is −17, the interference tone removal control unit 141 represents the tone suppressed output signal in signed binary representation as 101111. The quantizer 123 selects the sign bit as 1 as the processing in MSB position and truncates the processing bit in the LSB position. The quantizer selects the magnitude bits as 0, 1, and 1 from the bit position 5, bit position 4, and bit position 3. The quantizer 123 selects the rounding bit as 1 from the bit position 2. The magnitude of the integer value of the tone suppressed output signal is represented by the sign bit and the magnitude bits in the same order as 1011. The quantizer 123 adds the processing bits representing the magnitude of the integer value of the tone suppressed output signal to the rounding bit to obtain a signed binary representation of a quantized nearest integer value as 1011+1=1100 representing −4. On dividing the tone suppressed output signal −17 by 4 to reduce the number of processing bits to 4, the integer value obtained is −17/4=−4.25. The quantizer 123 successfully rounds the obtained integer to the nearest integer value −4 by using bit truncation and rounding as disclosed above.

If the tone suppressed output signal is 19, the interference tone removal control unit 141 represents the tone suppressed output signal in signed binary representation as 010011. The quantizer 123 selects the sign bit as 0 as the processing bit in MSB position and truncates the processing bit in the LSB position. The quantizer 123 selects the magnitude bits as 1, 0, and 0 from the bit position 5, bit position 4, and bit position 3. The quantizer 123 selects the rounding bit as 1 from the bit position 2. The magnitude of the integer value of the tone suppressed output signal is represented by the sign bit and the magnitude bits in the same order as 0100. The quantizer 123 adds the processing bits representing the magnitude of the integer value of the tone suppressed output signal to the rounding bit to obtain a signed binary representation of a quantized nearest integer value as 0100+1=0101 representing 5. On dividing the tone suppressed output signal 19 by 4 to reduce the number of processing bits to 4, the integer value obtained is 19/4=4.75. The quantizer 123 successfully rounds the obtained integer to the nearest integer value 5 by using bit truncation and rounding as disclosed above.

If the tone suppressed output signal is 1.7, the interference tone removal control unit 141 represents the tone suppressed output signal in signed binary representation as 010001. The quantizer 123 selects the sign bit as 0 as the processing bit in MSB position and truncates the processing bit in the LSB position. The quantizer 123 selects the magnitude bits as 1, 0, and 0 from the bit position 5, bit position 4, and bit position 3. The quantizer 123 selects the rounding bit as 0 from the bit position 2. The magnitude of the integer value of the tone suppressed output signal is represented by the sign bit and the magnitude bits in the same order as 0100. The quantizer 123 adds the processing bits representing the magnitude of the integer value of the tone suppressed output signal to the rounding bit to obtain a signed binary representation of a quantized nearest integer value as 0100+ =0100 representing 4. On dividing the tone suppressed output signal 17 by 4 to reduce the number of processing bits to 4, the integer value obtained is 17/4=4.25. The quantizer 123 successfully rounds the obtained integer to the nearest integer value 4 by using bit truncation and rounding as disclosed above.

The interference tone removal control circuit of the interference tone removal module 106 programs and controls the quantizer 123 of each of the interference tone removal units 119, 124, . . . , 129 in selecting the sign bit, the magnitude bits, and the rounding bit. In an embodiment, the quantizer 123 truncates the processing bit in the LSB position of the tone suppressed output signal. In an embodiment, the quantizer 123 truncates the processing bits in the MSB position of the tone suppressed output signal. The quantizer 123 selects only a predetermined number of processing bits that are used for quantizing the tone suppressed output signal. On quantizing the Q bits to the P bits using the programmable bit selection and rounding, the quantizer 123 substantially reduces the maximum error in quantization of the tone suppressed output signal to +/−0.5 while not degrading the tone suppressed output signal and the noise floor of the N samples of the intermediate frequency data.

Figure 9:
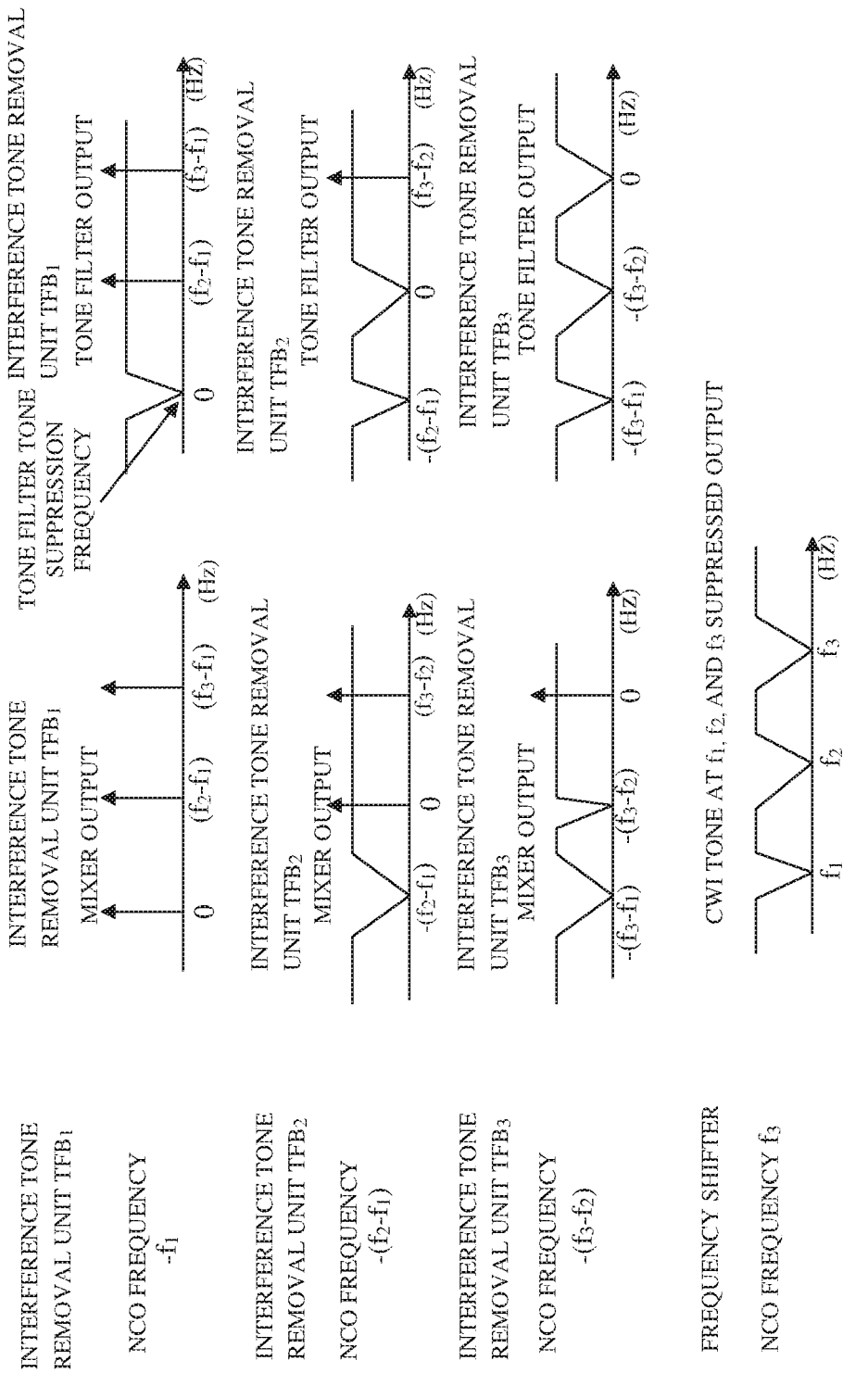
FIG. 9 exemplarily illustrates a schematic diagram showing a frequency spectrum of continuous wave interference tones with corresponding tone frequencies being removed by the interference tone removal module from the N samples of intermediate frequency data.

FIG. 9 exemplarily illustrates a schematic diagram showing a frequency spectrum of continuous wave interference tones with corresponding tone frequencies being removed by the interference tone removal module 106 from the N samples of intermediate frequency data. The interference tone determination module 104 detects 3 continuous wave interference tones with corresponding tone frequencies $f_1$, $f_2$, and $f_3$ in the N samples of the intermediate frequency data and transmits the detected tone frequencies to the interference tone tracker 105. The interference tone tracker 105 tracks the 3 detected continuous wave interference tones with corresponding tone frequencies f1, f2, and f3 in the N samples of the intermediate frequency data and transmits the tracked tone frequencies to the interference tone remover module 106. As exemplarily illustrated in FIG. 9, the 3 continuous wave interference tones are frequency components in the N samples of the intermediate frequency data with frequencies $f_1$, $f_2$, and $f_3$ and corresponding amplitudes. The interference tone removal control unit 141 enables 3 interference tone removal units $TFB_1$ 119, $TFB_2$ 124, and $TFB_3$ cascaded together for removing the 3 tracked continuous wave interference tones as disclosed in the detailed description of FIG. 4. A quantized tone suppressed output signal from $TFB_1$ 119 is input to $TFB_2$ 124 and a quantized tone suppressed output signal from $TFB_2$ 124 is input to $TFB_3$. The interference tone removal control unit 141 determines a resultant tone cancelling frequency of the second local carrier signal generated by a second signal generator or numerically controlled oscillator (NCO) 120, 125, . . . , 130 of each of the 3 interference tone removal units $TFB_1$ 119, $TFB_2$ 124, and $TFB_3$. For the interference tone removal unit $TFB_1$ 119, the interference tone removal control unit 141 configures the second signal generator 120 to generate a second local carrier signal of a resultant tone cancelling frequency $-f_1$. For interference tone removal unit $TFB_2$ 124, the interference tone removal control unit 141 configures the second signal generator 125 to generate a second local carrier signal of a resultant tone cancelling frequency $-(f_2-f_1)$. For the interference tone removal unit $TFB_3$, the interference tone removal control unit 141 configures the second signal generator to generate a second local carrier signal of a resultant tone cancelling frequency $-(f_3-f_2)$.

In the interference tone removal unit $TFB_1$ 119, the second mixer 121 mixes the generated second local carrier signal with $-f_1$ as the resultant tone cancelling frequency with the N samples of the intermediate frequency data and generates a tone frequency shifted digital signal as disclosed in the detailed description of FIG. 4. The generated tone frequency shifted digital signal comprises tone filter shifted frequency components. As exemplarily illustrated in FIG. 9, the frequency components of the tone frequency shifted digital signal are shifted by a frequency $-f_1$. The frequency component representing the continuous wave interference tone with corresponding tone frequency $f_1$ is shifted by a frequency $-f_1$ to the predetermined tone suppression frequency, that is, 0 Hz or near 0 Hz. The frequency component representing the continuous wave interference tone with corresponding tone frequency $f_2$ is shifted by a frequency $-f_1$. Similarly, the frequency component representing the continuous wave interference tone with corresponding tone frequency $f_3$ is shifted by a frequency $-f_1$. The tone filter 122 of the interference tone removal unit $TFB_1$ 119 suppresses the tone filter shifted frequency components in the tone frequency shifted digital at the predetermined tone suppression frequency, that is, 0 Hz or near 0 Hz. The second amplitude estimator 122a of the tone filter 122 of the interference tone removal unit $TFB_1$ 119 computes a mean value of the amplitudes of the tone filter shifted frequency components over a predetermined amplitude estimation period and the subtractor 122b of the tone filter 122 subtracts the computed mean of the amplitudes of the tone filter shifted frequency components from each of the tone filter shifted frequency components. The computed mean of the amplitudes of the tone filter shifted frequency components when subtracted from the tone filter shifted frequency components with frequencies as 0 Hz suppresses the frequency components with frequency 0 Hz. That is, the continuous wave interference tone of tone frequency $f_1$ is suppressed and a tone suppressed output signal free of the continuous wave interference tone of tone frequency $f_1$ as exemplarily illustrated in FIG. 9. The tone suppressed output signal is input to the interference tone removal unit $TFB_2$ 124 for removing the tone filter shifted frequency components representing the continuous wave interference tones at the frequencies $f_2-f_1$ and $f_3-f_1$.

In the interference tone removal unit $TFB_2$ 124, the second mixer 126 mixes the generated second local carrier signal with $-(f_2-f_1)$ as the resultant tone cancelling frequency with the tone suppressed output signal of the interference tone removal unit $TFB_1$ 119 and generates a tone frequency shifted digital signal as disclosed in the detailed description of FIG. 4. The generated tone frequency shifted digital signal comprises tone filter shifted frequency components. As exemplarily illustrated in FIG. 9, the frequency components of the tone frequency shifted digital signal are shifted by a frequency $-(f_2-f_1)$. The frequency component representing the continuous wave interference tone with frequency $f_2-f_1$ is shifted by a frequency $-(f_2-f_1)$ to the predetermined tone suppression frequency, that is, 0 Hz or near 0 Hz. The frequency component representing the continuous wave interference tone with frequency $f_3$31 $f_1$ is shifted by a frequency $-(f_2-f_1)$. Therefore, the frequency component representing the continuous wave interference tone with frequency $f_3-f_1$ is shifted to $f_3-f_2$. The frequency component corresponding to the continuous wave interference tone with tone frequency $f_1$ is shifted by a frequency $-(f_2-f_1)$ to the frequency $-(f_2-f_1)$.

The tone filter 127 of the interference tone removal unit $TFB_2$ 124 suppresses the tone filter shifted frequency components in the tone frequency shifted digital at the predetermined tone suppression frequency, that is, 0 Hz or near 0 Hz. The second amplitude estimator of the tone filter 127 of the interference tone removal unit $TFB_2$ 124 computes a mean value of the amplitudes of the tone filter shifted frequency components over a predetermined amplitude estimation period and the subtractor of the tone filter 127 subtracts the computed mean of the amplitudes of the tone filter shifted frequency components from each of the tone filter shifted frequency components. The computed mean of the amplitudes of the tone filter shifted frequency components when subtracted from the tone filter shifted frequency components with frequencies as 0 Hz suppresses the frequency components with frequency 0 Hz. That is, the continuous wave interference tone of tone frequency $f_2$ which was shifted to 0 Hz is suppressed and a tone suppressed output signal free of the continuous wave interference tones of tone frequencies $f_1$ and $f_2$ is generated as exemplarily illustrated in FIG. 9. The tone suppressed output signal is input to the interference tone removal unit $TFB_3$ for removing the tone filter shifted frequency components representing the continuous wave interference tones at the frequencies $f_3-f_2$. The frequency component corresponding to the continuous wave interference tone of tone frequency $f_1$ is at the frequency $-(f_2-f_1)$. That is, the tone suppressed output signal has a frequency shift of $f_2$.

In the interference tone removal unit $TFB_3$, the second mixer mixes the generated second local carrier signal with $-(f_3-f_2)$ as the resultant tone cancelling frequency with the tone suppressed output signal of the interference tone removal unit $TFB_2$ 124 and generates a tone frequency shifted digital signal as disclosed in the detailed description of FIG. 4. The generated tone frequency shifted digital signal comprises tone filter shifted frequency components. As exemplarily illustrated in FIG. 9, the frequency components of the tone frequency shifted digital signal are shifted by a frequency $-(f_3-f_2)$. The frequency component representing the continuous wave interference tone with frequency $f_3-f_2$ is shifted by a frequency $-(f_3-f_2)$ to the predetermined tone suppression frequency, that is, 0 Hz or near 0 Hz. The tone filter of the interference tone removal unit $TFB_3$ suppresses the tone filter shifted frequency components in the tone frequency shifted digital at the predetermined tone suppression frequency, that is, 0 Hz or near 0 Hz. The second amplitude estimator of the tone filter of the interference tone removal unit $TFB_3$ computes a mean value of the amplitudes of the tone filter shifted frequency components over a predetermined amplitude estimation period and the subtractor of the tone filter subtracts the computed mean of the amplitudes of the tone filter shifted frequency components from each of the tone filter shifted frequency components. The computed mean of the amplitudes of the tone filter shifted frequency components when subtracted from the tone filter shifted frequency components with frequencies as 0 Hz suppresses the frequency components with frequency 0 Hz. That is, the continuous wave interference tone of tone frequency $f_3$ which was shifted to 0 Hz is suppressed and a tone suppressed output signal free of the continuous wave interference tones of tone frequencies $f_1$, $f_2$, and $f_3$ is generated as exemplarily illustrated in FIG. 9. The frequency components corresponding to the continuous wave interference tones of tone frequencies $f_1$ and $f_2$ are at the frequencies $-(f_3-f_1)$ and $-(f_3-f_2)$ respectively. That is, the tone suppressed output signal output by the interference tone removal unit $TFB_3$ has a frequency shift of $f_3$.

The tone filter selector 134 passes the tone suppressed output signal output by the interference tone removal unit $TFB_3$ to the frequency shifter 136 through variable delay module 135. The frequency shifter 136 compensates for the frequency shift $f_3$ using the local signal generator 137 by generating a third local carrier signal of carrier frequency $f_3$. The third local carrier signal is mixed with the tone suppressed output signal with a frequency shift of $f_3$ in a complex mixer 138 of the frequency shifter 136. On mixing, the tone suppressed output signal is shifted by a frequency $f_3$ to obtain N samples of the intermediate frequency data, free of the continuous wave interference tones of tone frequencies $f_1$, $f_2$, and $f_3$, at an intermediate frequency, same as the intermediate frequency of the intermediate frequency data received from the radio frequency (RF) chip 101 as exemplarily illustrated in FIG. 9.

The tones processing system provides improvements in the satellite communication technology as the tones processing system 103 integrated into a global navigation satellite system (GNSS) receiver detects and removes continuous wave interference tones from the GNSS signals with a reduced logic area and power consumption. The tones processing system compensates for the phase rotation in the GNSS signals by performing phase estimation of the GNSS signal.

Figure 10:
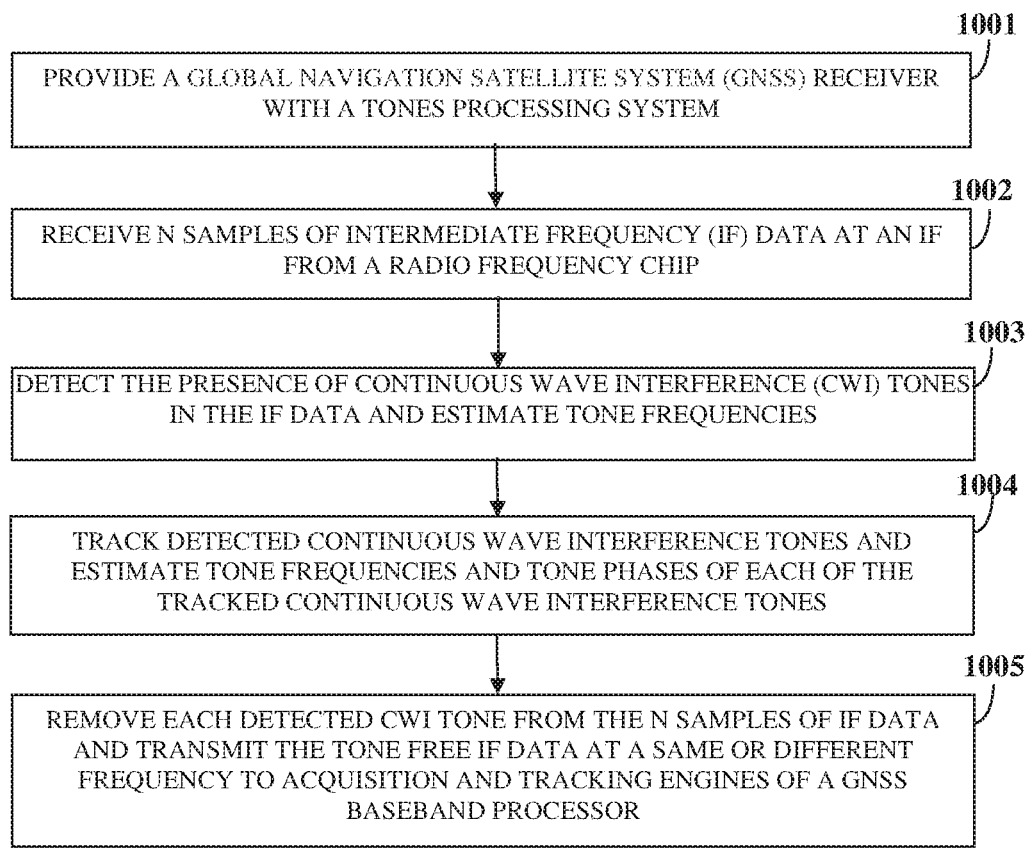
FIG. 10 exemplarily illustrates a flowchart comprising the steps performed by the tones processing system for detecting and removing one or more continuous wave interference tones from N samples of intermediate frequency data.

FIG. 10 exemplarily illustrates a flowchart comprising the steps performed by the tones processing system 103 for detecting and removing one or more continuous wave interference tones from N samples of intermediate frequency data. The GNSS receiver 102 integrated with the tones processing system 103 is provided 1001. A radio frequency (RF) chip 101 of the GNSS receiver 102 receives a GNSS signal and down converts the received GNSS signal to an intermediate frequency. The tones processing system 103 of the GNSS receiver 102 receives 1002 N samples of intermediate frequency data at the intermediate frequency from the RF chip 101. The interference tone determination module 104 of the tones processing system 103 detects 1003 the presence of the continuous wave interference tones and estimates tone frequencies corresponding to the detected continuous wave interference tones as disclosed in the detailed description of FIGS. 1A-1B. The interference tone tracker module 105 of the tones processing system 103 tracks 1004 detected continuous wave interference tones and estimates tone frequencies and tone phases of each of the tracked continuous wave interference tones as disclosed in the detailed description of FIGS. 1A-1B. The interference tone removal module 106 of the tones processing system 103 removes 1005 each tracked continuous wave interference tone from the N samples of the intermediate frequency data and generates tone free intermediate frequency data, that is, the tone suppressed output signal. The interference tone removal module 106 transmits the tone free intermediate frequency data at a same or a different frequency to acquisition and tracking engines of the GNSS baseband processor 109 for further processing. The interference tone removal module 106 transmits the tone free intermediate frequency data at a different frequency when frequency shifter 136 is disabled and bypassed. The different frequency indicates the frequency shift $-f_Y$ introduced due to the interference tone removal unit 129 of the interference tone removal module 106. In an embodiment, the interference tone removal module 106 can transmit the intermediate frequency data at the same frequency as that of the intermediate frequency data received from the RF chip 101 by mixing the tone suppressed output signal from the interference tone removal unit $TFB_Y$ 129 by $f_Y$ using the frequency shifter 136, without by-passing. In another embodiment, the interference tone removal module 106 can transmit the intermediate frequency data at a different frequency as that of the intermediate frequency data received from the RF chip 101 by mixing the tone suppressed output signal from the interference tone removal unit $TFB_Y$ 129 by any frequency using the frequency shifter 136, without by-passing.

Figure 11A:
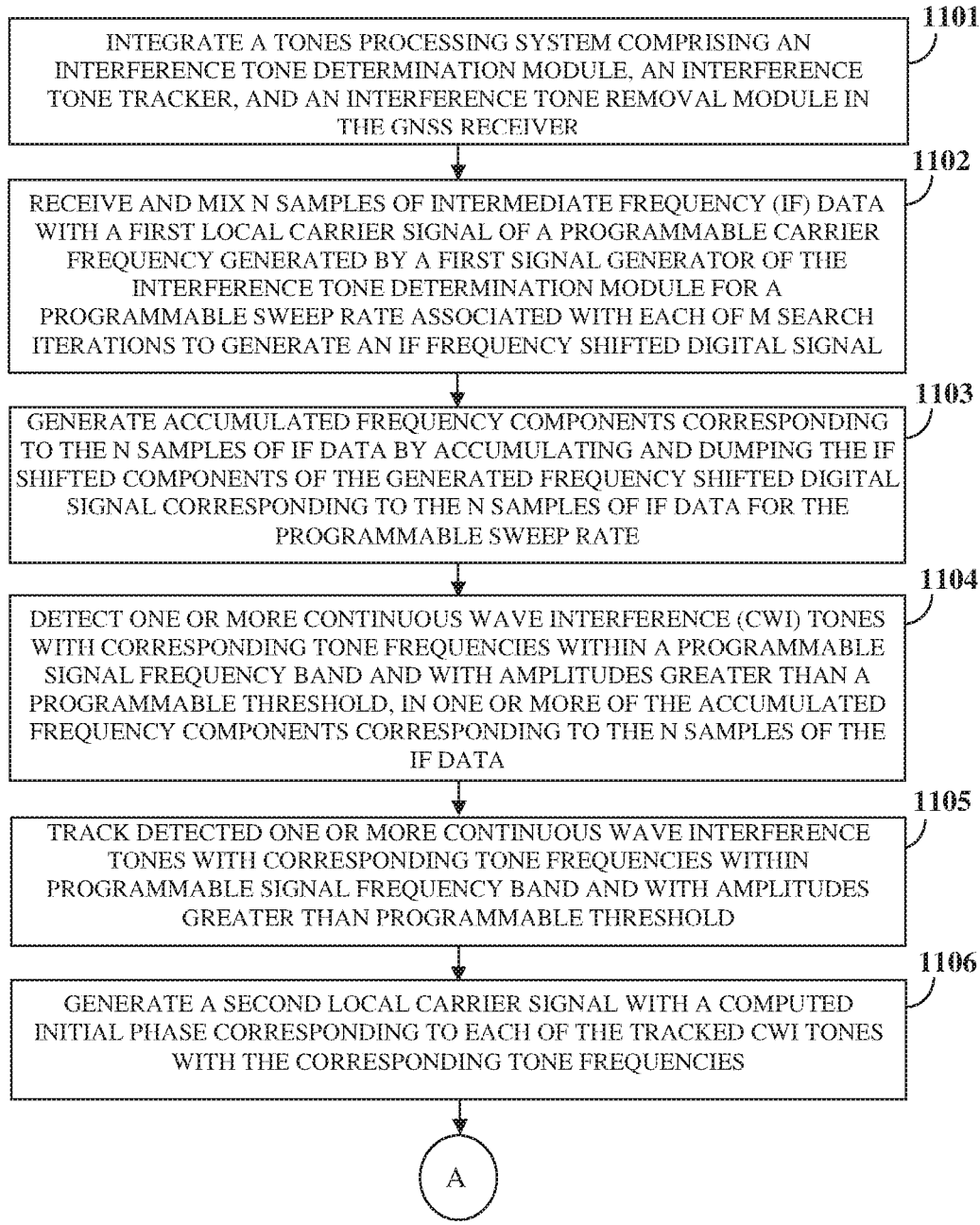
FIGS. 11A-11B illustrates a method for detecting and removing one or more continuous wave interference tones from N samples of intermediate frequency data with reduced logic area and power consumption.
Figure 11B:
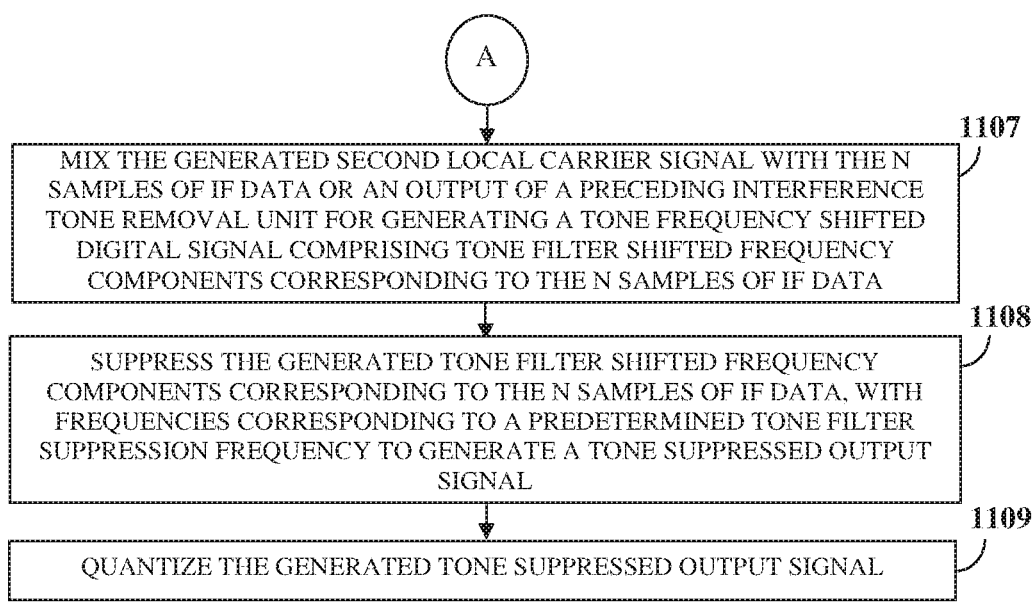

FIGS. 11A-11B illustrates a method for detecting and removing one or more continuous wave interference tones from N samples of intermediate frequency data with reduced logic area and power consumption. In the method disclosed herein, the tones processing system 103 comprising the interference tone determination module 104, the interference tone tracker 105, and the interference tone removal module 106 is integrated 1101 in the global navigation satellite system (GNSS) receiver 102 exemplarily illustrated in FIGS. 1A-1C. The interference tone determination module 104 comprises a first mixer 112, an integrate and dump filter 113, and an interference tone detection module 114 exemplarily illustrated in FIG. 2. The interference tone removal module 106 comprises one or more interference tone removal units 119, 124, . . . , 129 cascaded together with each of the interference tone removal units 119, 124, . . . , 129 comprising a second signal generator 120, 125, . . . , 130, a second mixer 121, 126, . . . , 131, a tone filter 122, 127, . . . 132, and a quantizer 123, 128, . . . , 133 as exemplarily illustrated in FIG. 4, and as disclosed in the detailed description of FIG. 2 and FIG. 4. The first mixer 112 of the interference tone determination module 104 receives and mixes 1102 the N samples of the intermediate frequency data with a first local carrier signal of a programmable carrier frequency to generate an intermediate frequency shifted digital signal comprising intermediate frequency shifted components within a programmable signal frequency band. The first signal generator 111 generates the first local carrier signal for a programmable sweep rate associated with each of M search iterations as disclosed in the detailed description of FIG. 2. The integrate and dump filter 113 generates 1103 accumulated frequency components corresponding to the N samples of the intermediate frequency data by accumulating and dumping the intermediate frequency shifted components of the generated intermediate frequency shifted digital signal for the programmable sweep rate. The interference tone detection module 114, comprising a first amplitude estimator 115, a threshold comparator 116, and a peak detector 117, detects 1104 the continuous wave interference tones with corresponding tone frequencies within the programmable signal frequency band and with amplitudes greater than the programmable threshold in one or more of the accumulated frequency components corresponding to the N samples of the intermediate frequency data as disclosed in the detailed description of FIG. 2. The interference tone determination module 104 transmits the tone frequencies to the interference tone tracker 105. The interference tone tracker (105) tracks (1105) the detected continuous wave interference tones with the corresponding tone frequencies within the programmable signal frequency band and with the amplitudes greater than the programmable threshold. The interference tone tracker module (105) transmits the tracked tone frequencies and tone phases of the tracked continuous wave interference tones to the interference tone removal module 106 for removal of the tracked continuous wave interference tones. The interference tone tracker module (105) further estimates tone frequencies and tone phases of each of the tracked continuous wave interference tones.

The interference tone determination module 104 transmits the corresponding tone frequencies of the detected continuous wave interference tones to the global navigation satellite system (GNSS) baseband processor 109 of the GNSS receiver 102 for tracking one or more continuous wave interference tones with the corresponding tone frequencies within the programmable signal frequency band from the N samples of the intermediate frequency data. In an embodiment, the interference tone tracker 105 transmits corresponding tone frequencies of the tracked continuous wave interference tones and a tone phase of each of the tracked continuous wave interference tones to the interference tone removal control unit 140 and the GNSS baseband processor 109 of the GNSS receiver 102 for removing the tracked continuous wave interference tones with the corresponding tone frequencies within the programmable signal frequency band from the N samples of the intermediate frequency data.

The second signal generator 120, 125, . . . , 130 in each of the interference tone removal units 119, 124, . . . , 129 generates 1106 a second local carrier signal with a computed initial phase corresponding to the tracked continuous wave interference tones. The second local carrier signal comprises a resultant tone cancelling frequency that is determined from a corresponding one of the tone frequencies of the tracked continuous wave interference tones. The second local carrier signal further comprises a tone cancelling frequency of a second local carrier signal generated by a preceding interference tone removal unit. The second mixer 121, 126, . . . , 131 in each of the interference tone removal units 119, 124, . . . , 129 mixes 1107 the generated second local carrier signal with the N samples of the intermediate frequency data or an output of the preceding interference tone removal unit for generating a tone frequency shifted digital signal comprising tone filter shifted frequency components corresponding to the N samples of the intermediate frequency data as disclosed in the detailed description of FIG. 4. The tone filter 122, 127, . . . , 132 of each of the interference tone removal units 119, 124, . . . , 129 suppresses 1108 the generated tone filter shifted frequency components corresponding to the N samples of the intermediate frequency data, with frequencies corresponding to a predetermined tone filter suppression frequency to generate a tone suppressed output signal comprising the suppressed tone filter shifted frequency components, free of the tracked continuous wave interference tones. The quantizer 123, 128, . . . , 133 of each of the interference tone removal units 119, 124, . . . , 129 quantizes 1109 the generated tone suppressed output signal free of the tracked continuous wave interference tones.

For the detection of the continuous wave interference tones with corresponding tone frequencies within the programmable signal frequency band from one or more of the accumulated frequency components by the interference tone detection module 114, the first amplitude estimator 115 of the interference tone detection module 114 computes the amplitude of the accumulated frequency components corresponding to the N samples of the intermediate frequency data, and the threshold comparator 116 compares the computed amplitude of the accumulated frequency components with the programmable threshold for determining the accumulated frequency components indicative of continuous wave interference tones with corresponding tone frequencies in the programmable signal frequency band as disclosed in the detailed description of FIG. 4. Furthermore, the peak detector 117 detects the continuous wave interference tones with the corresponding tone frequencies in the programmable signal frequency band by selecting the one or more of the accumulated frequency components corresponding to the N samples of intermediate frequency data with computed amplitudes greater than the computed amplitudes of the remaining accumulated frequency components that are indicative of the continuous wave interference tones.

For the suppression of the generated tone filter shifted frequency components corresponding to the N samples of the intermediate frequency data, with frequencies corresponding to a predetermined tone filter suppression frequency by the tone filter, a second amplitude estimator 122*a*, 127*a*, . . . , 132*a* of the tone filter 122, 127, . . . , 132 computes a mean value of amplitudes of the tone filter shifted frequency components of the generated tone frequency shifted digital signal corresponding to the N samples of the intermediate frequency data over a predetermined amplitude estimation period and a subtractor 122*a*, 127*b*, . . . , 132*b* of the tone filter 122, 127, . . . , 132 subtracts the computed mean value of the amplitudes of the tone filter shifted frequency components of the generated tone frequency shifted digital signal from each of the tone filter shifted frequency components of the generated tone frequency shifted digital signal with the frequencies corresponding to the predetermined tone filter suppression frequency to generate the tone suppressed output signal as disclosed in the detailed description of FIG. 7.

The interference tone removal module 106 further comprises a tone filter selector 134 for selecting the quantized tone suppressed output signal free of the tracked continuous wave interference tones received from one of the interference tone removal units 119, 124, . . . , 129 and a variable delay module 135 operably connected to the tone filter selector 134 for maintaining the latency in clock cycles from the input to the interference tone removal module 106 to the output of the variable delay module 135 as a constant value. In an embodiment, the interference tone removal module 106 further comprises a frequency shifter 136 for shifting frequency of the selected quantized tone suppressed output signal output from the variable delay module 135 and a bypass selector 139 for bypassing the frequency shifter 136 and transmitting the selected quantized tone suppressed output signal output from the variable delay module 135 to the global navigation satellite system (GNSS) baseband processor 109 based on the tone frequencies of the tracked continuous wave interference tones for generating location data as disclosed in the detailed description of FIG. 4.

The quantizer 123, 128, . . . , 133 of each of the interference tone removal units 119, 124, . . . , 129 of the interference tone removal module 106 quantizes the generated tone suppressed output signal by reducing the number of processing bits in the generated tone suppressed output signal using bit truncation and rounding of an integer value of the generated tone suppressed output signal to a nearest quantized integer value by selecting a first predetermined number of the processing bits in the generated tone suppressed output signal for determining a sign of the integer value of the generated tone suppressed output signal. Further, the quantizer 123 selects a second predetermined number of the processing bits apart from the selected first predetermined number of the processing bits in the generated tone suppressed output signal for determining a magnitude of the integer value of the generated tone suppressed output signal and rounds the determined magnitude of the integer value of the generated tone suppressed output signal to the nearest quantized integer value using the processing bits in the generated tone suppressed output signal apart from the selected first predetermined number of the processing bits and the selected second predetermined number of the processing bits as disclosed in the detailed description of FIG. 8. The interference tone determination module 104 and the interference tone removal module 106 further comprises an interference tone determination control unit 118 and an interference tone removal control unit 141 respectively as disclosed in the detailed description of FIG. 2 and FIG. 4.

Figure 12:
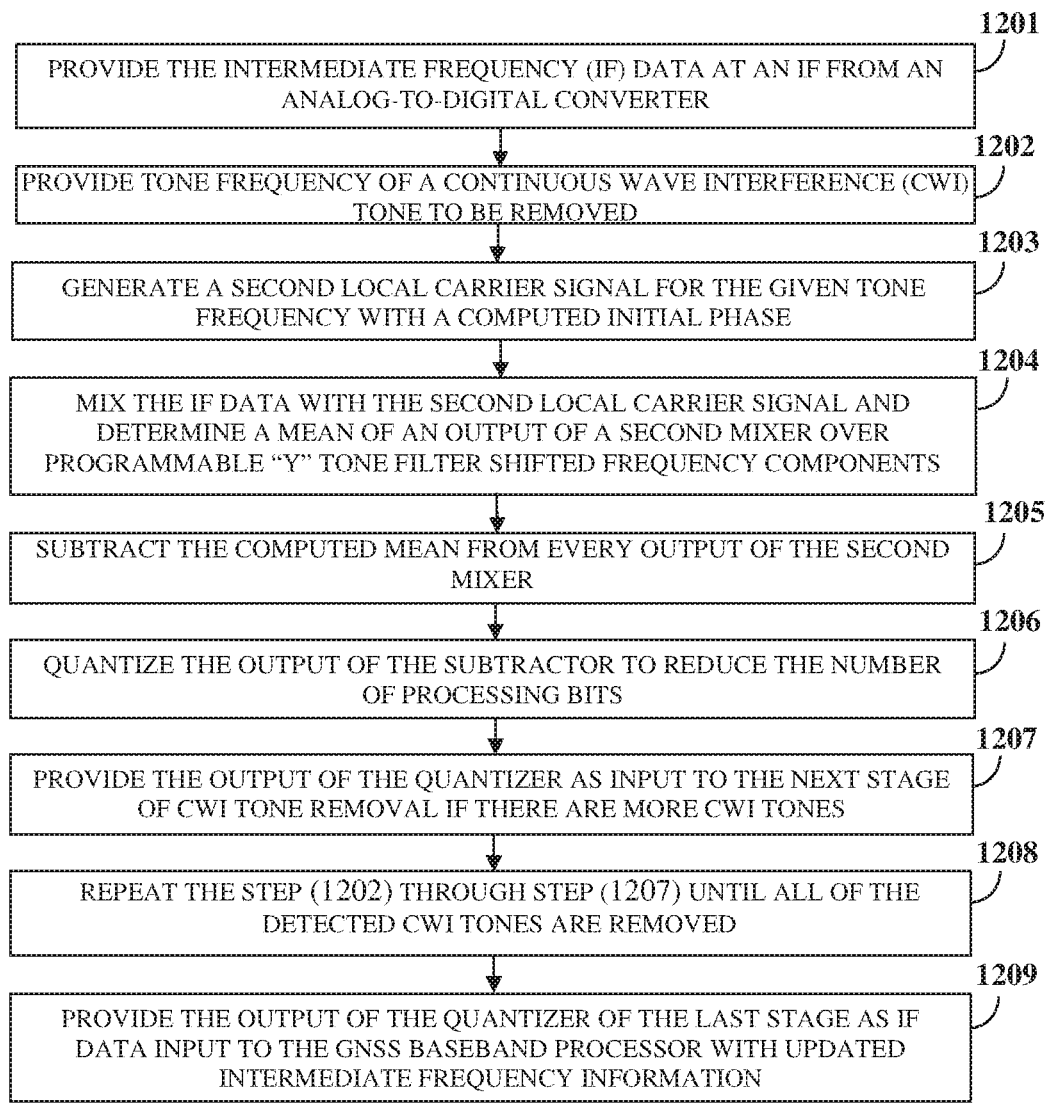
FIG. 12 exemplarily illustrates a flow chart comprising the steps performed by the interference tone removal module of the tones processing system for removing one or more detected continuous wave interference tones from N samples of intermediate frequency data.

FIG. 12 exemplarily illustrates a flow chart comprising the steps performed by the interference tone removal module 106 of the tones processing system 103 for removing one or more tracked continuous wave interference tones from N samples of intermediate frequency data. The interference tone removal module 106 comprises one or more interference tone removal units 119, 124, . . . , 129 cascaded together based on the number of the tracked continuous wave interference tones and each of the interference tone removal units 119, 124, . . . , 129 comprises a second signal generator 120, 125, . . . , 130, a second mixer 121, 126, . . . , 131, a tone filter 122, 127, . . . , 132, and a quantizer 123, 128, . . . , 133. The intermediate frequency data from an analog to digital converter of the radio frequency (RF) chip 101 is provided 1201 to an interference tone removal unit, for example, $TFB_1$ 119 in FIG. 5. The interference tone determination module 104 of the tones processing system 103 transmits tone frequencies of the detected continuous wave interference tones to the GNSS baseband processor 109 or the interference tone tracker 105. The interference tone removal unit $TFB_1$ 119 is provided 1202 with a tone frequency of a tracked continuous wave interference tone that is to be removed from the N samples of the received intermediate frequency data. The second signal generator 120 of the interference tone removal unit $TFB_1$ 119 generates 1203 a second local carrier signal for the given tone frequency with a computed initial phase. The second mixer 121 mixes 1204 the received intermediate frequency data with the second local carrier signal and the second amplitude estimator 122a of the tone filter 122 of the interference tone removal unit $TFB_1$ 119 determines a mean of the output of the second mixer 121 over a programmable number, Y of the tone filter shifted frequency components to be integrated, as disclosed in the detailed description of FIG. 5. The output of the second mixer 121 is a tone frequency shifted digital signal comprising tone filter shifted frequency components. The second amplitude estimator 122a computes the mean of the output of the second mixer 121 every consecutive Y tone filter shifted frequency components or over random intervals. The subtractor 122b of the tone filter 122 of the interference tone removal unit $TFB_1$ 119 subtracts 1205 the computed mean from every output of the second mixer 121 as disclosed in the detailed description of FIG. 7. The quantizer 123 of the interference tone removal unit $TFB_1$ 119 quantizes 1206 the output of the subtractor 122b to reduce the number of processing bits as disclosed in the detailed description of FIG. 8. The output of the quantizer 123 of the interference tone removal unit $TFB_1$ 119 is provided 1207 as input to the next stage of tone removal, that is, to the interference tone removal unit $TFB_2$ 124 as disclosed in the detailed description of FIG. 5, if there are more continuous wave interference tones tracked by the interference tone tracker 105. The interference tone removal module 106 repeats 1208 the steps 1202 to 1207 for different interference tone removal units $TFB_2$ 124, $TFB_3$, . . . , $TFB_Y$ 129 until all the tracked continuous wave interference tones are removed from the N samples of the intermediate frequency data. The interference tone removal module 106 provides 1209 the output of the quantizer 133 of the last stage of tone removal, that is, the interference tone removal unit $TFB_Y$ 129 as intermediate frequency data input to the global navigation satellite system (GNSS) baseband processor 109 with an updated intermediate frequency data free of the tracked continuous wave interference tones as disclosed in the detailed description of FIG. 5 The foregoing examples have been provided merely for explanation and are in no way to be construed as limiting of the method and the tones processing system 103 disclosed herein. While the method and the tones processing system 103 have been described with reference to various embodiments, it is understood that the words, which have been used herein, are words of description and illustration, rather than words of limitation. Furthermore, although the method and the tones processing system 103 have been described herein with reference to particular means, materials, and embodiments, the method and the tones processing system 103 are not intended to be limited to the particulars disclosed herein; rather, the method and the tones processing system 103 extend to all functionally equivalent structures, methods and uses, such as are within the scope of the appended claims. While multiple embodiments are disclosed, it will be understood by those skilled in the art, having the benefit of the teachings of this specification, that the method and the tones processing system 103 disclosed herein are capable of modifications and other embodiments may be effected and changes may be made thereto, without departing from the scope and spirit of the method and the tones processing system 103 disclosed herein

We claim:

1. A tones processing system (103) integrated in a global navigation satellite system receiver (102) for detecting and removing one or more continuous wave interference tones from N samples of intermediate frequency data with reduced logic area and power consumption, said tones processing system (103) comprising:
- an interference tone determination module (104) for sequentially searching for said one or more continuous wave interference tones in said N samples of said intermediate frequency data within a programmable signal frequency band in each of M search iterations, said interference tone determination module (104) comprising:
  - a first mixer (112) for receiving and mixing said N samples of said intermediate frequency data with a first local carrier signal of a programmable carrier frequency generated by a first signal generator (111) for a programmable sweep rate associated with said each of said M search iterations to generate an intermediate frequency shifted digital signal comprising intermediate frequency shifted components within said programmable signal frequency band, corresponding to said N samples of said intermediate frequency data;
  - an integrate and dump filter (113) operably connected to said first mixer (112) for generating accumulated frequency components corresponding to said N samples of said intermediate frequency data by accumulating and dumping said intermediate frequency shifted components of said generated intermediate frequency shifted digital signal corresponding to said N samples of said intermediate frequency data for said programmable sweep rate; and
  - an interference tone detection module (114) operably connected to said integrate and dump filter (113) for detecting said one or more continuous wave interference tones with corresponding tone frequencies within said programmable signal frequency band and with amplitudes greater than a programmable threshold, in one or more of said accumulated frequency components corresponding to said N samples of said intermediate frequency data;
- an interference tone tracker (105) operably connected to said interference tone determination module (104) and an interference tone removal module (106) for tracking said detected one or more continuous wave interference tones with said corresponding tone frequencies within said programmable signal frequency band and with said amplitudes greater than said programmable threshold, wherein said interference tone tracker (105) further estimates a tone phase of each of said tracked one or more continuous wave interference tones; and
- said interference tone removal module (106) operably connected to said interference tone determination module (104) and said interference tone tracker (105) for removing said tracked one or more continuous wave interference tones with said corresponding tone frequencies within said programmable signal frequency band and with said amplitudes greater than said programmable threshold, from said N samples of said intermediate frequency data, said interference tone removal module (106) comprising one or more interference tone removal units (119, 124, . . . , and 129) corresponding to said tracked one or more continuous wave interference tones cascaded to each other, each of said one or more interference tone removal units (119, 124, . . . , and 129) comprising:
  - a second signal generator (120, 125, . . . , and 130) for generating a second local carrier signal with a computed initial phase corresponding to each of said tracked one or more continuous wave interference tones with said corresponding tone frequencies, wherein said second local carrier signal comprises a resultant tone cancelling frequency that is determined from a corresponding one of said tone frequencies of each of said tracked one or more continuous wave interference tones, and wherein said second local carrier signal further comprises a tone cancelling frequency of said second local carrier signal generated by a preceding one of said one or more interference tone removal units 119, 124, . . . , and 129;
  - a second mixer (121, 126, . . . , and 131) operably connected to said second signal generator (120, 125, . . . , and 130) for mixing said generated second local carrier signal with one of: said N samples of said intermediate frequency data and an output of said preceding one of said one or more interference tone removal units (119, 124, . . . , and 129), for generating a tone frequency shifted digital signal comprising tone filter shifted frequency components corresponding to said N samples of said intermediate frequency data;
  - a tone filter (122, 127, . . . , and 132) operably connected to said second mixer (121, 126, . . . , and 131) for suppressing said generated tone filter shifted frequency components corresponding to said N samples of said intermediate frequency data, with frequencies corresponding to a predetermined tone filter suppression frequency, to generate a tone suppressed output signal comprising said suppressed tone filter shifted frequency components, free of said tracked one or more continuous wave interference tones; and
  - a quantizer (123, 128, . . . , and 133) operably connected to said tone filter (122, 127, . . . , 132) for quantizing said generated tone suppressed output signal free of said tracked one or more continuous wave interference tones.

2. The tones processing system (103) of claim 1, wherein said interference tone detection module (114) comprises:
- a first amplitude estimator (115) operably connected to said integrate and dump filter (113) for computing amplitudes of said accumulated frequency components corresponding to said N samples of said intermediate frequency data;
- a threshold comparator (116) operably connected to said first amplitude estimator (115) for comparing said computed amplitudes of said accumulated frequency components corresponding to said N samples of said intermediate frequency data with said programmable threshold for determining said accumulated frequency components indicative of continuous wave interference tones with corresponding tone frequencies in said programmable signal frequency band; and
- a peak detector (117) operably connected to said threshold comparator (116) for detecting said one or more continuous wave interference tones with said corresponding tone frequencies in said programmable signal frequency band by selecting one or more of said accumulated frequency components with said computed amplitudes greater than said computed amplitudes of remaining said accumulated frequency components that are indicative of said continuous wave interference tones.

3. The tones processing system (103) of claim 1 operably connected to a baseband tracking unit deployed in said baseband processor (109) of said global navigation satellite system receiver (102) for compensating a phase rotation of said N samples of said intermediate frequency data based on a phase of a global navigation satellite system signal being tracked and a tone phase of said each of said detected one or more continuous wave interference tones transmitted by said baseband processor (109).

4. The tones processing system (103) of claim 1, wherein said interference tone determination module (104) further comprises an interference tone determination control unit (118) operably connected to said first signal generator (111), said integrate and dump filter (113), and said interference tone detection module (114) for configuring said programmable signal frequency band, said programmable carrier frequency, said programmable sweep rate, and said programmable threshold.

5. The tones processing system (103) of claim 1, wherein said tone filter (122, 127, . . . , and 132) of said each of said one or more interference tone removal units (119, 124, . . . , and 129) comprises:
  a second amplitude estimator (122a, 127a, . . . , 132a) for computing a mean value of amplitudes of said tone filter shifted frequency components of said generated tone frequency shifted digital signal corresponding to said N samples of said intermediate frequency data over a predetermined amplitude estimation period; and
  a subtractor (122b, 127b, . . . , and 132b) for subtracting said computed mean value of said amplitudes of said tone filter shifted frequency components of said generated tone frequency shifted digital signal corresponding to said N samples of said intermediate frequency data from each of said tone filter shifted frequency components of said generated tone frequency shifted digital signal with said frequencies corresponding to said predetermined tone filter suppression frequency to generate said tone suppressed output signal.

6. The tones processing system (103) of claim 1, wherein said interference tone removal module (106) further comprises:
  a tone filter selector (134) operably connected to said one or more interference tone removal units (119, 124, . . . , and 129) for selecting said quantized tone suppressed output signal received from one of said one or more interference tone removal units (119, 124, . . . , and 129); and
  a variable delay module (135) operably connected to said tone filter selector (134) for maintaining latency in clock cycles of said selected quantized tone suppressed output signal received from said one of said one or more interference tone removal units (119, 124, . . . , and 129) as a constant value.

7. The tones processing system (103) of claim 6, wherein said variable delay module (135) delays said selected quantized tone suppressed output signal output from said tone filter selector (134) in a time domain.

8. The tones processing system (103) of claim 6, wherein said interference tone removal module (106) further comprises a frequency shifter (136) operably connected to said variable delay module (135) for shifting frequency of said selected quantized tone suppressed output signal output from said variable delay module (135) to an intermediate frequency of said N samples of said intermediate frequency data received by said interference tone determination module (104) based on said tone frequencies of said tracked one or more continuous wave interference tones.

9. The tones processing system (103) of claim 8, wherein said interference tone removal module (106) further comprises a bypass selector (139) for bypassing said frequency shifter (136) and transmitting said selected quantized tone suppressed output signal output from said variable delay module (135) to a baseband processor (109) of said global navigation satellite system receiver (102) for generating location data.

10. The tones processing system (103) of claim 9, wherein said interference tone removal module (106) further comprises an interference tone removal control unit (141) operably connected to said one or more interference tone removal units (119, 124, . . . , and 129), said tone filter selector (134), said variable delay module (135), said frequency shifter (136), and said bypass selector (139) for:
  deactivating said one or more interference tone removal units (119, 124, . . . , and 129) based on a number of said tracked one or more continuous wave interference tones, determining said resultant tone cancelling frequency of said second local carrier signal, and configuring said second signal generator (120, 125, . . . , 130) of said each of said one or more interference tone removal units (119, 124, . . . , and 129) with said determined resultant tone cancelling frequency;
  selecting processing bits in said generated tone suppressed output signal of said tone filter (122, 127, . . . , 132) of said each of said one or more interference tone removal units (119, 124, . . . , and 129) for bit truncation and rounding in said quantizer (123, 128, . . . , 133) of said each of said one or more interference tone removal units (119, 124, . . . , and 129);
  configuring said tone filter selector (134) to select said quantized tone suppressed output signal received from one of said one or more interference tone removal units (119, 124, . . . , and 129);
  configuring said variable delay module (135) to maintain a constant delay from input of said each of said one or more interference tone removal units (119, 124, . . . , and 129) to output of said variable delay module (135);
  configuring frequency of a local carrier signal generated by a local signal generator (137) of said frequency shifter (136) to shift said frequency of said selected quantized tone suppressed output signal output from said variable delay module (135) to said intermediate frequency of said N samples of said intermediate frequency data received by said interference tone determination module (104) based on said tone frequencies of said detected one or more continuous wave interference tones that are tracked prior to said removal of said detected one or more continuous wave interference tones from said N samples of said intermediate frequency data; and
  configuring said bypass selector (139) to bypass said frequency shifter (136) and transmit said selected quantized tone suppressed output signal output from said variable delay module (135) to said baseband processor (109) of said global navigation satellite system receiver (102).

11. The tones processing system (103) of claim 10, wherein said second signal generator (120, 125, . . . , and 130) of said each of said one or more interference tone removal units comprises:
  a phase accumulator (142) operably connected to said interference tone removal control unit (141) for generating a phase value; and
  a phase-to-amplitude converter (143) operably connected to said phase accumulator for determining an amplitude of said second local carrier signal to be generated by said second signal generator (120, 125, . . . , and 130) corresponding to said generated phase value.

12. The tones processing system (103) of claim 10, wherein said interference tone tracker (105) transmits said corresponding tone frequencies of said tracked one or more continuous wave interference tones and said tone phase of each of said tracked one or more continuous wave interference tones to said interference tone removal control unit (141) and said baseband processor (109) of said global navigation satellite system receiver (102) for facilitating said removal of said tracked one or more continuous wave interference tones with said corresponding tone frequencies within said programmable signal frequency band and with said amplitudes greater than said programmable threshold from said N samples of said intermediate frequency data.

13. The tones processing system (103) of claim 10, wherein said interference tone removal control unit (141) further determines a tone amplitude estimation rate of a second amplitude estimator (122a, 127a, . . . , 132a) of said tone filter (122, 127, . . . , 132) of said each of said one or more interference tone removal units (119, 124, . . . , and 129) to be one of a continuous rate and a periodic rate for computing a mean value of amplitudes of said tone filter shifted frequency components of said generated tone frequency shifted digital signal corresponding to said N samples of said intermediate frequency data over a predetermined amplitude estimation period.

14. The tones processing system (103) of claim 8, wherein a signal frequency band in which said shifted frequency of said selected quantized tone suppressed output signal corresponding to said N samples of said intermediate frequency data output from said frequency shifter (136) lies is one of equal to and not equal to a signal frequency band of said N samples of said intermediate frequency data.

15. The tones processing system (103) of claim 1, wherein said quantizer (123, 128, . . . , 133) of said each of said one or more interference tone removal units (119, 124, . . . , and 129) of said interference tone removal module (106) reduces number of processing bits in said generated tone suppressed output signal using bit truncation and rounding of an integer value of said generated tone suppressed output signal to a nearest quantized integer value by:
  selecting a first predetermined number of said processing bits in said generated tone suppressed output signal for determining a sign of said integer value of said generated tone suppressed output signal;
  selecting a second predetermined number of said processing bits apart from said selected first predetermined number of said processing bits in said generated tone suppressed output signal for determining a magnitude of said integer value of said generated tone suppressed output signal; and
  rounding said determined magnitude of said integer value of said generated tone suppressed output signal to said nearest quantized integer value using remaining said processing bits in said generated tone suppressed output signal apart from said selected first predetermined number of said processing bits and said selected second predetermined number of said processing bits.

16. The tones processing system (103) of claim 1, wherein said predetermined tone filter suppression frequency is one of 0 hertz and a frequency closer to 0 hertz.

17. A method for detecting and removing one or more continuous wave interference tones from N samples of intermediate frequency data with reduced logic area and power consumption, said method comprising:

integrating (1101) a tones processing system (103) in a global navigation satellite system receiver (102), said tones processing system (103) comprising an interference tone determination module (104), interference tone tracker (105), and an interference tone removal module 106, wherein said interference tone determination module (104) comprises a first mixer (112), an integrate and dump filter (113), and an interference tone detection module (114), wherein said interference tone tracker (105) comprises one or more interference tone tracking units, and wherein said interference tone removal module (106) comprises one or more interference tone removal units (119, 124, . . . , and 129) cascaded to each other, each of said one or more interference tone removal units (119, 124, . . . , and 129) comprising a second signal generator (120, 125, . . . , and 130), a second mixer (121, 126, . . . , and 131), a tone filter (122, 127, . . . , and 132), and a quantizer (123, 128, . . . , and 133);

receiving (1102) and mixing, by said first mixer (112) of said interference tone determination module (104), said N samples of said intermediate frequency data with a first local carrier signal of a programmable carrier frequency generated by a first signal generator (111) of said interference tone determination module (104) for a programmable sweep rate associated with each of M search iterations to generate an intermediate frequency shifted digital signal comprising intermediate frequency shifted components within a programmable signal frequency band, corresponding to said N samples of said intermediate frequency data;

generating (1103) accumulated frequency components corresponding to said N samples of said intermediate frequency data by accumulating and dumping said intermediate frequency shifted components of said generated frequency shifted digital signal corresponding to said N samples of said intermediate frequency data for said programmable sweep rate by said integrate and dump filter (113) of said interference tone determination module (104);

detecting (1104) said one or more continuous wave interference tones with corresponding tone frequencies within said programmable signal frequency band and with amplitudes greater than a programmable threshold, in one or more of said accumulated frequency components corresponding to said N samples of said intermediate frequency data, by said interference tone detection module (114) of said interference tone determination module (104);

tracking (1105) said detected one or more continuous wave interference tones with said corresponding tone frequencies within said programmable signal frequency band and with said amplitudes greater than said programmable threshold by said interference tone tracker (105) operably connected to said interference tone determination module (104) and said interference tone removal module (106), wherein said interference tone tracker module (105) further estimates a tone phase of each of said tracked one or more continuous wave interference tones;

generating (1106) a second local carrier signal with a computed initial phase corresponding to each of said tracked one or more continuous wave interference tones with said corresponding tone frequencies by said second signal generator (120) of said each of said one or more interference tone removal units (119, 124, . . . , and 129) of said interference tone removal module (106), wherein said second local carrier signal comprises a resultant tone cancelling frequency that is determined from a corresponding one of said tone frequencies of said each of said tracked one or more continuous wave interference tones, and wherein said second local carrier signal further comprises a tone cancelling frequency of said second local carrier signal generated by a preceding one of said one or more interference tone removal units (119, 124, . . . , and 129);

mixing (1107) said generated second local carrier signal with one of: said N samples of said intermediate frequency data and an output of said preceding one of said one or more interference tone removal units (119, 124, . . . , and 129), for generating a tone frequency shifted digital signal comprising tone filter shifted frequency components corresponding to said N samples of said intermediate frequency data, by said second mixer (121, 126, . . . , and 131) of said each of said one or more interference tone removal units (119, 124, . . . , and 129);

suppressing (1108) said generated tone filter shifted frequency components corresponding to said N samples of said intermediate frequency data, with frequencies corresponding to a predetermined tone filter suppression frequency, by said tone filter (122, 127, . . . , and 132) of said each of said one or more interference tone removal units (119, 124, . . . , and 129) to generate a tone suppressed output signal comprising said suppressed tone filter shifted frequency components, free of said tracked one or more continuous wave interference tones; and quantizing (1109) said generated tone suppressed output signal free of said tracked one or more continuous wave interference tones, by said quantizer (123, 128, . . . , and 133) of said each of said one or more interference tone removal units (119, 124, . . . , and 129).

18. The method of claim 17, wherein said detection of said one or more continuous wave interference tones with said corresponding tone frequencies within said programmable signal frequency band and with said amplitudes greater than said programmable threshold, in said one or more of said accumulated frequency components corresponding to said N samples of said intermediate frequency data by said interference tone detection module (114) is performed by:

computing amplitudes of said accumulated frequency components corresponding to said N samples of said intermediate frequency data by a first amplitude estimator (115) of said interference tone detection module (114);

comparing said computed amplitudes of said accumulated frequency components corresponding to said N samples of said intermediate frequency data with said programmable threshold for determining said accumulated frequency components indicative of continuous wave interference tones with corresponding tone frequencies in said programmable signal frequency band by a threshold comparator (116) of said interference tone detection module (114); and detecting said one or more continuous wave interference tones with said corresponding tone frequencies in said programmable signal frequency band by selecting one or more of said accumulated frequency components with said computed amplitudes greater than said computed amplitudes of remaining said accumulated frequency components that are indicative of said continuous wave interference tones by a peak detector (117) of said interference tone detection module (114).

19. The method of claim 17, further comprising compensating a phase rotation of said N samples of said intermediate frequency data by a baseband tracking unit deployed in said baseband processor (109) of said global navigation satellite system receiver (102) based on a phase of a global navigation satellite system signal being tracked and a tone phase of said each of said detected one or more continuous wave interference tones transmitted by said baseband processor (109).

20. The method of claim 17, wherein said suppression of said generated tone filter shifted frequency components corresponding to said N samples of said intermediate frequency data, with frequencies corresponding to a predetermined tone filter suppression frequency by said tone filter (122, 127, . . . , and 132) of said each of said one or more interference tone removal units (119, 124, . . . , and 129) is performed by:

computing a mean value of amplitudes of said tone filter shifted frequency components of said generated tone frequency shifted digital signal corresponding to said N samples of said intermediate frequency data over a predetermined amplitude estimation period by a second amplitude estimator (122a, 127a, . . . , and 132a) of said tone filter (122, 127, . . . , and 132); and subtracting said computed mean value of said amplitudes of said tone filter shifted frequency components of said generated tone frequency shifted digital signal corresponding to said N samples of said intermediate frequency data from each of said tone filter shifted frequency components of said generated tone frequency shifted digital signal with said frequencies corresponding to said predetermined tone filter suppression frequency by a subtractor (122b, 127b, . . . , and 132b) of said tone filter (122, 127, . . . , and 132) to generate said tone suppressed output signal.

21. The method of claim 17, further comprising selecting said quantized tone suppressed output signal received from one of said one or more interference tone removal units (119, 124, . . . , and 129), by a tone filter selector (134) of said interference tone removal module (106), and maintaining latency in clock cycles of said selected quantized tone suppressed output signal received from said one of said one or more interference tone removal units (119, 124, . . . , and 129) as a constant value by a variable delay module (135) of said interference tone removal module (106).

22. The method of claim 21, further comprising shifting frequency of said selected quantized tone suppressed output signal output from said variable delay module (135) to an intermediate frequency of said N samples of said intermediate frequency data received by said interference tone determination module (104), by a frequency shifter (136) of said interference tone removal module (106), based on said tone frequencies of said tracked one or more continuous wave interference tones.

23. The method of claim 22, further comprising bypassing said frequency shifter (136) by a bypass selector (139) of said interference tone removal module (106) and transmitting said selected quantized tone suppressed output signal output from said variable delay module (135) to a baseband processor (109) of said global navigation satellite system receiver (102) for generating location data.

24. The method of claim 17, further comprising transmitting corresponding tone frequencies of said tracked one or more continuous wave interference tones and said tone phase of each of said tracked one or more continuous wave interference tones to said interference tone removal control unit (141) and said baseband processor (109) of said global navigation satellite system receiver (102) by an interference tone tracker (105) operably connected to said interference tone determination module (104) and said interference tone removal module (106) for facilitating said removal of said tracked one or more continuous wave interference tones with said corresponding tone frequencies within said programmable signal frequency band and with said amplitudes greater than said programmable threshold from said N samples of said intermediate frequency data.

25. The method of claim 17, wherein said quantization of said generated tone suppressed output signal by said quantizer (123, 128, . . . , and 133) of said each of said one or more interference tone removal units (119, 124, . . . , and 129) of said interference tone removal module (106) comprises reducing number of processing bits in said generated tone suppressed output signal using bit truncation and rounding of an integer value of said generated tone suppressed output signal to a nearest quantized integer value by:

selecting a first predetermined number of said processing bits in said generated tone suppressed output signal for determining a sign of said integer value of said generated tone suppressed output signal;

selecting a second predetermined number of said processing bits apart from said selected first predetermined number of said processing bits in said generated tone suppressed output signal for determining a magnitude of said integer value of said generated tone suppressed output signal; and rounding said determined magnitude of said integer value of said generated tone suppressed output signal to said nearest quantized integer value using remaining said processing bits in said generated tone suppressed output signal apart from said selected first predetermined number of said processing bits and said selected second predetermined number of said processing bits.

\* \* \* \* \*